US008122066B2

(12) United States Patent
Castellanos et al.

(10) Patent No.: US 8,122,066 B2
(45) Date of Patent: Feb. 21, 2012

(54) DATABASE QUERY PROFILER

(75) Inventors: Maria G. Castellanos, Sunnyvale, CA (US); Ivo Jose Jimenez Ramos, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 580 days.

(21) Appl. No.: 12/251,320

(22) Filed: Oct. 14, 2008

(65) Prior Publication Data
US 2010/0094829 A1    Apr. 15, 2010

(51) Int. Cl.
G06F 7/00    (2006.01)
(52) U.S. Cl. .................................... 707/803; 707/713
(58) Field of Classification Search .................. 707/803, 707/713, 999.004
See application file for complete search history.

(56) References Cited

U.S. PATENT DOCUMENTS

| | | | | |
|---|---|---|---|---|
| 4,829,427 | A * | 5/1989 | Green ................................... | 1/1 |
| 5,404,510 | A * | 4/1995 | Smith et al. ........................... | 1/1 |
| 5,664,173 | A * | 9/1997 | Fast ................................ | 707/694 |
| 6,115,704 | A * | 9/2000 | Olson et al. ........................... | 1/1 |
| 6,266,658 | B1 * | 7/2001 | Adya et al. ............................. | 1/1 |
| 6,353,830 | B1 * | 3/2002 | Yee et al. ............................... | 1/1 |
| 6,360,213 | B1 * | 3/2002 | Wagstaff et al. ........................ | 1/1 |
| 6,449,609 | B1 * | 9/2002 | Witkowski ............................. | 1/1 |
| 6,718,320 | B1 * | 4/2004 | Subramanian et al. ........ | 707/719 |
| 7,412,439 | B2 * | 8/2008 | Bossman et al. ....................... | 1/1 |
| 7,499,907 | B2 * | 3/2009 | Brown et al. .......................... | 1/1 |
| 2002/0184202 | A1 * | 12/2002 | Hara et al. ............................. | 707/3 |
| 2003/0088541 | A1 * | 5/2003 | Zilio et al. ............................. | 707/1 |
| 2003/0093408 | A1 * | 5/2003 | Brown et al. .......................... | 707/2 |
| 2003/0192040 | A1 | 10/2003 | Vaughan | |
| 2003/0225768 | A1 * | 12/2003 | Chaudhuri et al. ............. | 707/10 |
| 2003/0229625 | A1 * | 12/2003 | Melchior et al. .................. | 707/3 |
| 2004/0139106 | A1 | 7/2004 | Bachman et al. | |
| 2005/0028134 | A1 * | 2/2005 | Zane et al. ...................... | 717/106 |
| 2005/0108199 | A1 * | 5/2005 | Ellis et al. ........................... | 707/2 |
| 2005/0125213 | A1 * | 6/2005 | Chen et al. ........................ | 703/22 |
| 2005/0223026 | A1 * | 10/2005 | Chaudhuri et al. ........ | 707/103 R |
| 2005/0246338 | A1 * | 11/2005 | Bird .................................. | 707/9 |
| 2005/0246637 | A1 * | 11/2005 | Knight et al. .................. | 715/700 |
| 2005/0283458 | A1 * | 12/2005 | Galindo-Legaria et al. ...... | 707/1 |
| 2006/0126631 | A1 | 6/2006 | Wajda et al. | |
| 2006/0136350 | A1 | 6/2006 | Jackson | |
| 2006/0149695 | A1 * | 7/2006 | Bossman et al. ................. | 706/48 |
| 2006/0282423 | A1 * | 12/2006 | Al-Omari et al. ................. | 707/4 |
| 2007/0067261 | A1 * | 3/2007 | Burger et al. ...................... | 707/2 |
| 2007/0083489 | A1 * | 4/2007 | Lawande .......................... | 707/2 |
| 2007/0250524 | A1 * | 10/2007 | Le ................................. | 707/102 |
| 2007/0288495 | A1 * | 12/2007 | Narasayya et al. ............ | 707/101 |
| 2008/0270989 | A1 * | 10/2008 | Ahadian et al. ............... | 717/126 |
| 2009/0144303 | A1 * | 6/2009 | Bhide et al. .................... | 707/101 |
| 2009/0193006 | A1 * | 7/2009 | Herrnstadt ....................... | 707/5 |
| 2009/0198715 | A1 * | 8/2009 | Barbarek ...................... | 707/101 |

* cited by examiner

*Primary Examiner* — Hung T Vy
*Assistant Examiner* — Phuong Thao Cao

(57) ABSTRACT

A query profiling system and associated operating methods implement a database query profiler. The illustrative database system comprises a parser, a query model, a catalog manager, a binder and view rewriter, and a query analyzer. The parser parses statements by checking syntax of a statement according to a structured query language (SQL) grammar and representing the statements in a syntax-oriented internal format. The catalog manager processes data definition SQL statements (DDL) that are transformed to the internal representation; transform the representations of the DDL to database objects abstractions; groups the database objects into a Catalog. The binder and view rewriter take the internal representations obtained by parsing workload queries (data manipulation SQL statements or DML) and rewrite table references by their corresponding View definitions; bind database object references to their actual database objects contained in the catalog. The query analyzer analyzes the queries for relevant attributes and stores the attributes in a profile repository.

13 Claims, 27 Drawing Sheets

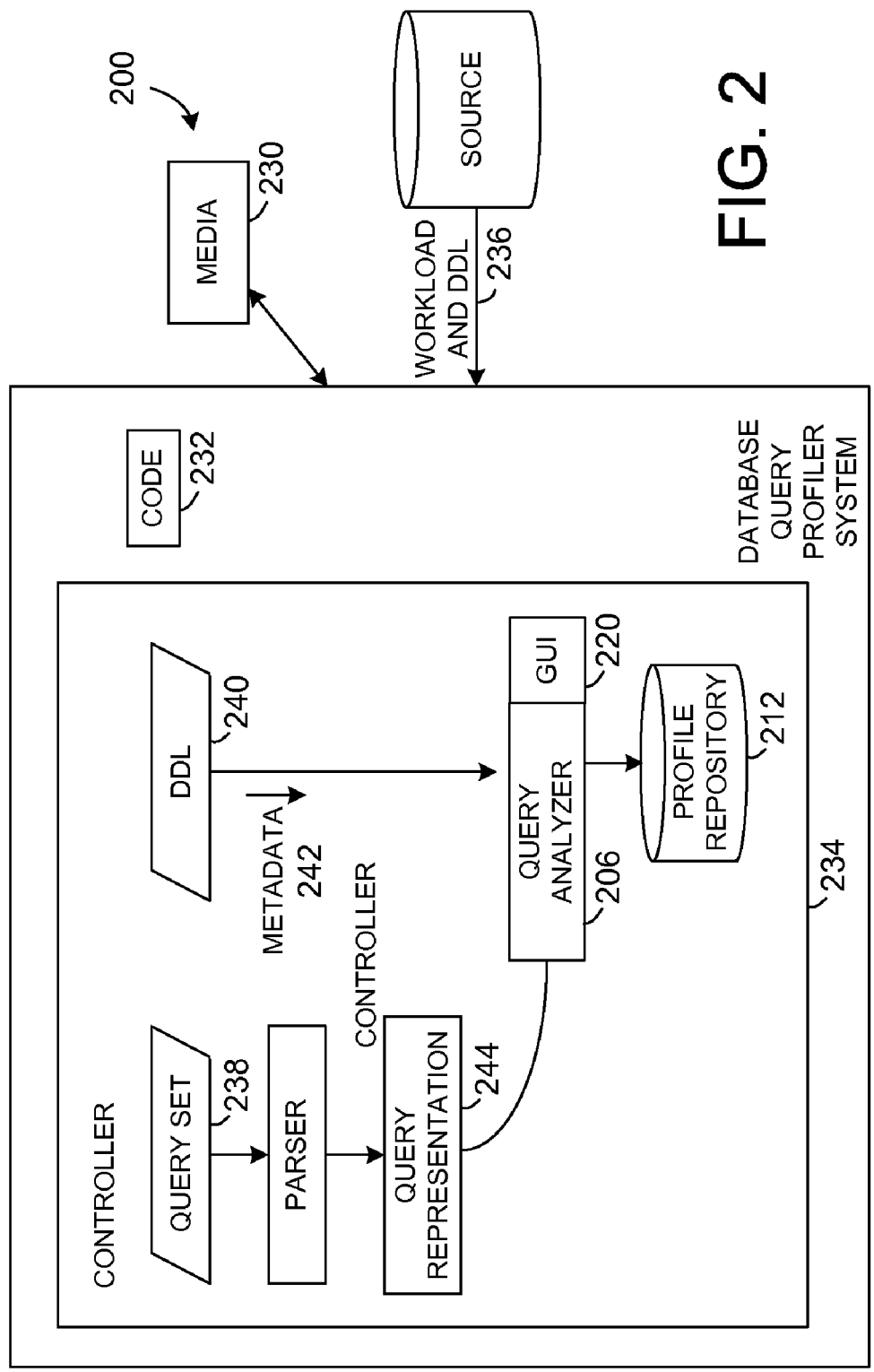

DATA PROFILER CONFIGURATION

DATA LOCATION

SYSTEM

DSN:
HOST:
CATALOG:
SCHEMA:
USER:
PASSWORD:

TEST

☐ Update Statistics
☐ Only Missing Histograms

Properties to Profile:

☒ UEC    ☒ Row Count    ☒ Skew    No. of Partitions: ☐

RE-USE EDITING

WL NAME:

FLAT FILES:
LOCAL
FOLDER: [        ] Browse

SSH HOST
HOST:
USER:
PASS:
FOLDER:

☑ Fix-width or    ☐ as column separator

[ OK ]  [ SAVE ]  [ LOAD FILE ]  [ CANCEL ]

FIG. 10F

DATA PROFILER CONFIGURATION

DATA LOCATION

SYSTEM

DSN:
HOST:
CATALOG:
SCHEMA:
USER:
PASSWORD:

[TEST]

☐ Update Statistics
☐ Only Missing Histograms

Properties to Profile:

☐ UEC   ☐ Row Count   ☐ Skew   No. of Partitions: [ ]

RE-USE EDITING

WL NAME:

FLAT FILES:
LOCAL
FOLDER: [C:\temp\tpcds-data\]  Browse

SSH HOST
HOST:
USER:
PASS:
FOLDER:

☑ Fix-width or   ☐ as column separator

[OK]  [SAVE]  [LOAD FILE]  [CANCEL]

FIG. 10I

FIG. 10K

DATABASE QUERY PROFILER

BACKGROUND

A query profile is typically obtained manually by looking to a query and writing in paper or a computer spreadsheet the relevant information contained within. Manual profiling is easy for simple queries but as the number and complexity of queries grow, the task becomes difficult and tedious.

More specifically, the profiling of queries is typically done manually by browsing through the queries and identifying relevant components. The user has to manually view each query and capture appropriate features into a document, typically a spreadsheet. The task is known as query fingerprinting and is very time consuming, cumbersome and error prone.

SUMMARY

Embodiments of a query profiler system and associated operating methods implement database query profiling. The illustrative query profiler system comprises a query model, a binder and view rewriter, and a query analyzer. A parser processes queries written in SQL and transforms them into a syntax-oriented, internal query model which is used to check against metadata extracted from another set of SQL statements (also known as data schema, data definition language or DDL) that is stored in an internal catalog of database objects. The view rewriter replaces views by their definition in the query model of each of the parsed queries. Then the binder binds references in a query to objects contained in the catalog. The query analyzer analyzes the queries for relevant attributes and stores the attributes in a profile repository.

BRIEF DESCRIPTION OF THE DRAWINGS

Embodiments of the invention relating to both structure and method of operation may best be understood by referring to the following description and accompanying drawings:

FIG. 2 is a schematic block diagram depicting an embodiment of an article of manufacture that implements a database query profiler;

FIGS. 10A through 10L are schematic display screens depicting aspects of a graphical user interface (GUI) for operating the query profiler.

DETAILED DESCRIPTION

Tools for automating the query profiling process are sought, relieving the user from the arduous task and making the process fast and efficient. A suitable tool can facilitate operation of applications that use the profiles. For example, in physical design the query profiles can be a basis for recommendations but since deriving the profiles using traditional manual techniques can be very slow, the whole design process can be impacted in usual conditions of time constraints.

Embodiments of systems and methods enable and facilitate profiling of database queries.

In an illustrative implementation, a method analyzes queries in a workload to create profiles characterized according to components. An illustrative system embodies the method as a tool to automate the profiling task.

In the context of information retrieval, a query is a precise request for information. Typically keywords from the query language are combined with Boolean operators and other modifiers. Analysis of one or several queries, for example in a set known as a batch or workload, can be useful to access relevant information. For a single query, a user can be interested in the number and type of predicates used, fields accessed, keywords used, among many others that depend on the language being used. For a workload, a user may be interested in the aggregation of single query attributes or other properties that arise from the grouping of query set. The process of analyzing one or more queries can be described as query profiling, which leads to the result of a query profile.

A user might be interested in obtaining a query profile for many reasons. For example, a query profile may be used to correlate the performance of running a query with some corresponding attributes such as complexity or number of predicates. Another useful query profile usage is in the physical design domain, for example to guide the physical design of a database.

A system and corresponding technique for automated query profiling is sought.

The various system and method embodiments operate as a query profiler that is an effective tool for efficiently profiling queries. The query profiler enables a useful technique for profiling SQL queries without investing large amounts of time. The query profiler is sufficiently robust to serve multiple purposes. The query profiler supports a GUI that can assist visualization and browsing of a query profile.

Figure 1:
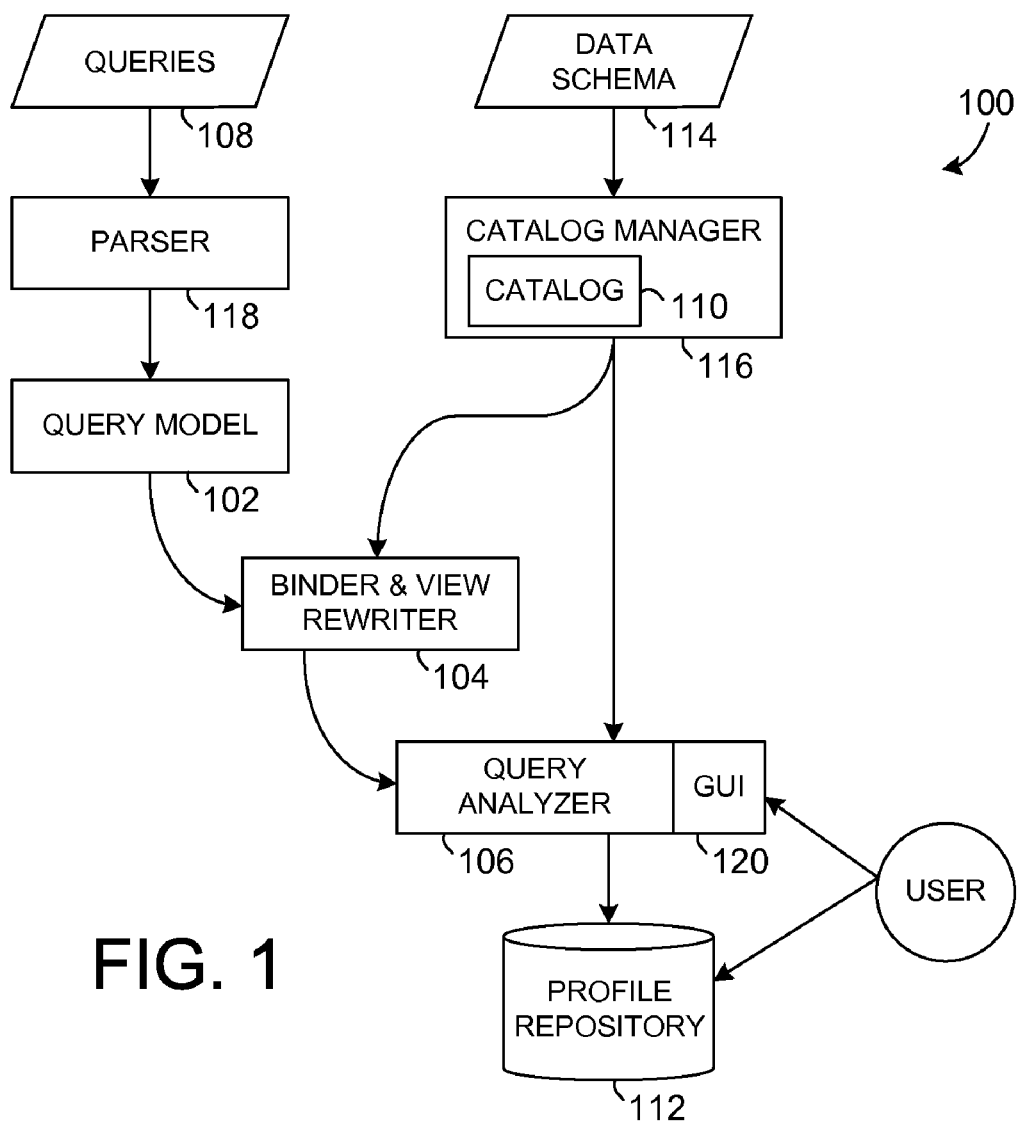
FIG. 1 is a schematic block diagram showing an embodiment of a query profiler system that implements a database query profiler.

Referring to FIG. 1, a schematic block diagram illustrates an embodiment of a query profiler system 100 that implements a database query profiling. The query profiler system 100 can operate as a query profiler that comprises a group of modules that accomplish tasks in a general profiling process. The query profiler includes multiple components in terms of high-level functional aspects.

The illustrative query profiler system 100 comprises a parser 118, a query model 102, a binder and view rewriter 104, and a query analyzer 106. The parser 118 parses SQL statements and transforms them into instances of an internal format 102. These are compared against metadata extracted from the data definition language (DDL) that is represented by the catalog 110. The binder and view rewriter 104 rewrites view definitions and binds references contained in instances of the internal format 102 to objects contained in the catalog 110. The query analyzer 106 analyzes the representations for relevant attributes and stores the attributes in a profile repository 112.

The query profiler system 100 can further comprise a data schema 114 a catalog manager 116, and a parser 118. The catalog manager 116 creates the catalog 110 by acquiring metadata sources that define a workload data schema and reading structured query language (SQL) statements contained in the metadata sources. The parser 118 parses the SQL statements, converts the parsed SQL statements to internal representations, and transforms them to database objects. The catalog manager 116 groups the database objects in the catalog 110.

In an example implementation, the binder and view rewriter 104 can be configured to bind table and column references by cannonicalizing table references into a catalog.schema.tablename format, checking the table reference for registration in the catalog, and determining whether the table reference is defined as a view. The binder and view rewriter 104 can further be implemented to substitute the table reference by a corresponding select statement for a table reference defined as a view, checking that attribute references are correct using the catalog based on information about the table, and determining whether column references point to a base table column or a derived table column. The binder and view rewriter 104 can bind the column reference directly to the base table column if the column reference points to the base table column, and follow a path of the derived tables column to a base table where the column reference originates, substituting all column references contained in predicates if the column reference points to the derived table column.

The query analyzer 106 can be configured to analyze the queries by scanning the query representations, and extracting distinct attributes based on type of data manipulation language (SQL statements commonly known as DML). The query analyzer 106 extracts attributes for SELECT statements. Example attributes from a SELECT statement include columns contained in the a select list, tables contained in a FROM list, restriction predicates, join predicates, group by columns, order by columns, and subqueries. The query analyzer 106 also extracts attributes for DELETE, INSERT, and UPDATE statements, including restriction predicates and subqueries.

The query profiler system 100 can also comprise a graphical user interface (GUI) 120 that enables a user to control various aspects of query profiler operation. The GUI 120 can enable selection of a profile repository by presenting a display screen for setting location of the profile repository 112 and receives a repository location specification from a user. The graphical user interface 120 facilitates definition of query workload by presenting a display screen for defining a query workload, receiving a query workload definition from the user, presenting a display screen for assigning a name to the query workload, and receiving a query workload name from the user. The GUI 120 enables specification of a data schema (DDL) source by presenting a display screen for selecting a data schema source, and receiving a data schema source selection from the user. The query analyzer 106 profiles database queries in the workload according to parameters set by the GUI 120 and the GUI 120 presents a display screen of a query profile showing a workload-wide view of a query set.

In an example embodiment, an illustrative query profiler can be a tool that implements a process used for relational database systems. Accordingly, the query profiler systems can process queries and data schemas expressed in the SQL language, for example for a Neoview SQL dialect for usage with the Neoview platform for an enterprise data warehouse made available by Hewlett-Packard Company of Palo Alto, Calif. Given a set of queries and data's DDL, wherein the queries-DDL pair can be called a workload, the query profiler analyzes the workload to obtain table and column references, restriction and join predicates, order and group by columns, and many other attributes.

Referring to FIG. 2, a schematic block diagram depicts an embodiment of an article of manufacture 200 that implements a database query profiler system. The illustrative article of manufacture 200 comprises a controller-usable medium 230 having a computer readable program code 232 embodied in a controller 234 for profiling database queries in a workload 236. The computer readable program code 232 causes the controller 234 to receive a query set 238 and a data definition language (DDL) model 240 and to extract metadata 242 from the DDL 240. The program code 232 further causes the controller 234 to convert data definition elements of the metadata 242 into a catalog of database objects, parse queries corresponding to a workload 236 to create a set of instances of query representations 244, and to bind table and column references in a query to a real table, view, or column object contained in the catalog. The program code 232 further causes the controller 234 to analyze the queries for relevant attributes and to store the attributes in a repository 212.

The GUI 220 can be implemented as a graphical user interface tool 220 that automates profiling of database queries.

Figure 3A:
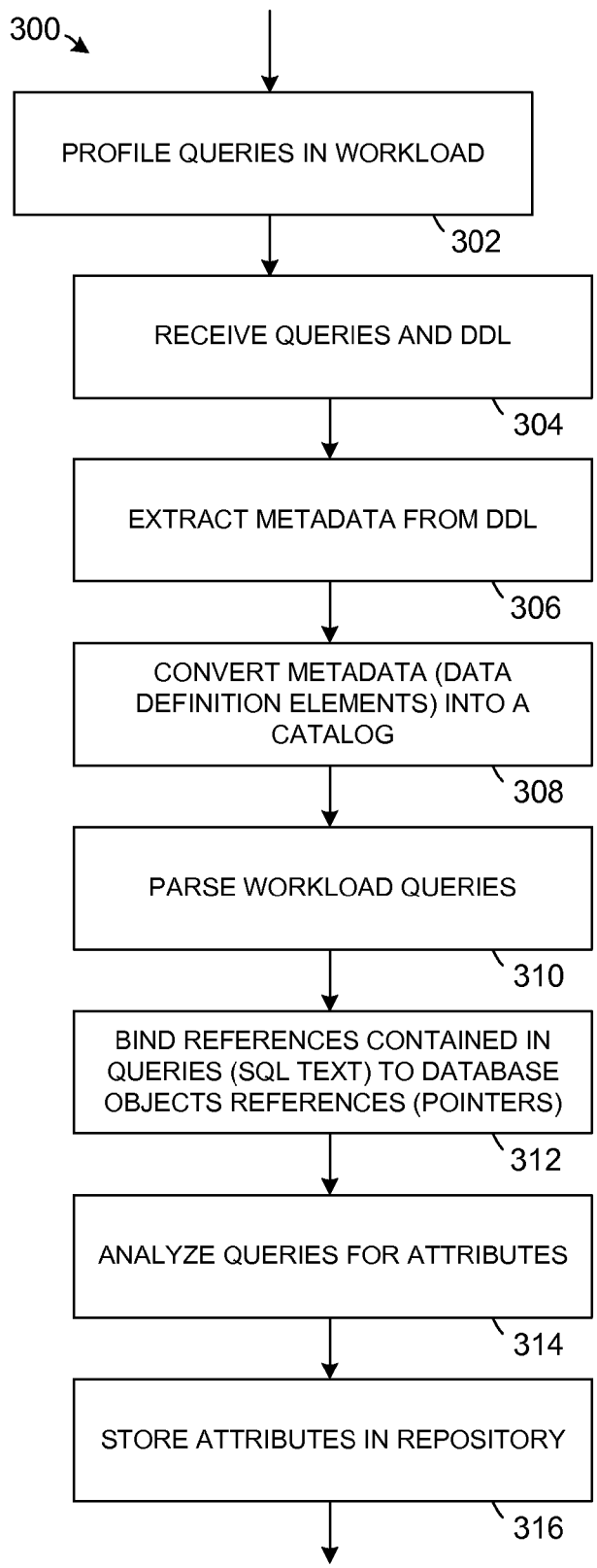
FIGS. 3A through 3G are flow charts illustrating one or more embodiments or aspects of a computer-executed method for profiling database queries.

Referring to FIGS. 3A through 3G, flow charts illustrate one or more embodiments or aspects of a computer-executed method for profiling database queries. FIG. 3A depicts a computer-executed method 300 for operating a query profiler system. The method 300 comprises profiling 302 database queries in a workload. The database queries can be profiled 302 by receiving 304 a query set and a data definition language (DDL) model, extracting 306 metadata of the DDL model, and converting 308 data definition elements of the metadata into a catalog of database objects. The method for profiling 302 database queries can further comprise parsing 310 queries corresponding to a workload to create a set of instances of query representations, and binding 312 table and column references in a query to a real table, view, or column object contained in the catalog. The queries are analyzed 314 for relevant attributes comprising complexity and number of predicates, and the attributes stored 316 in a repository.

Figure 3B:
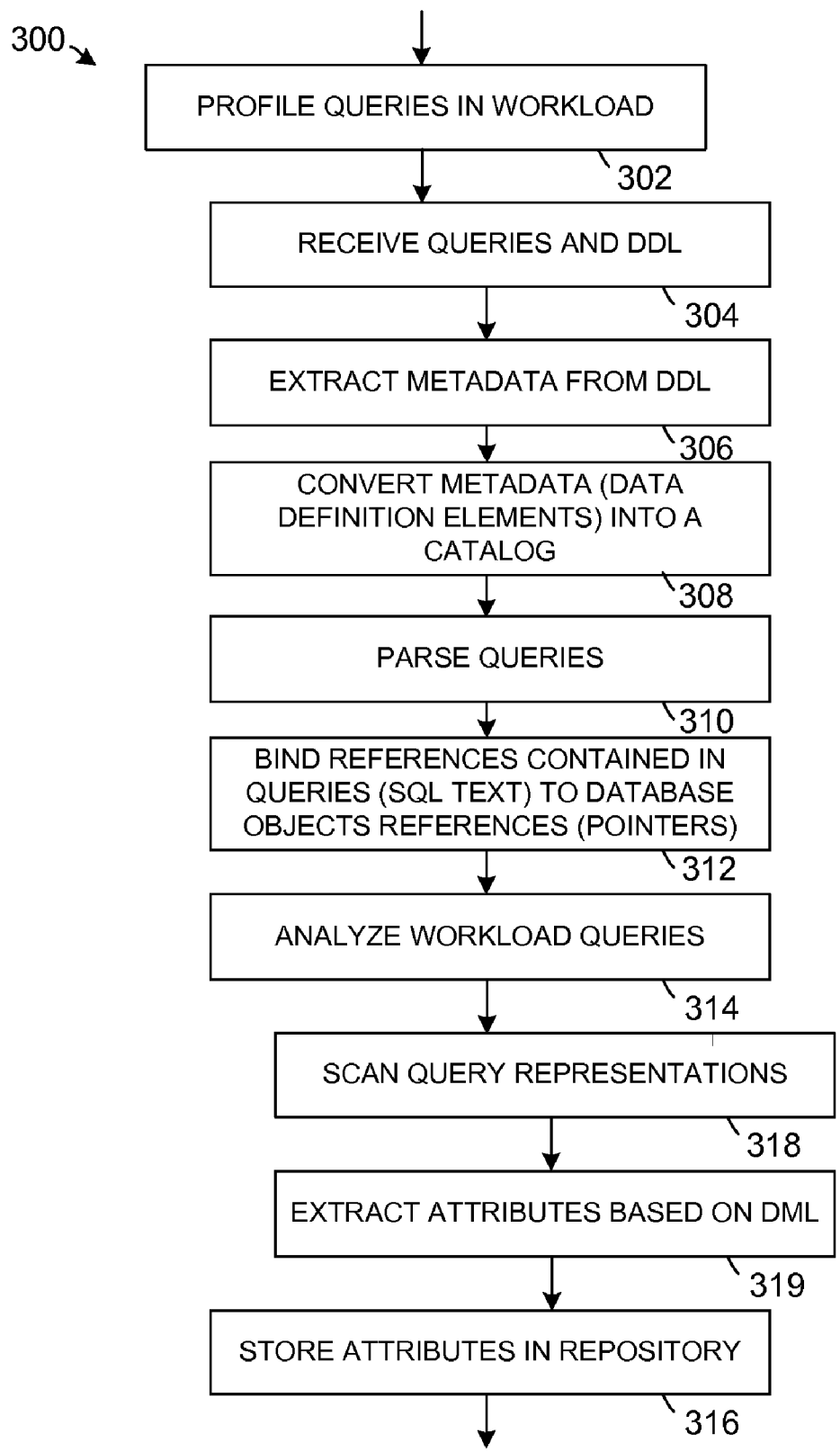

Referring to FIG. 3B, another embodiment of a method for profiling database queries in a workload can further comprise analyzing 314 the queries by scanning 318 the query representations, and extracting 319 distinct attributes based on type of data manipulation language (DML).

The attributes extracted 319 for SELECT statements can include columns contained in a list of columns contained in a select list, tables contained in a from list, restriction predicates, join predicates, group by columns, order by columns, subqueries, and the like. Attributes extracted 319 for DELETE, INSERT, and UPDATE statements can include restriction predicates, subqueries, and other similar attributes.

Figure 3C:
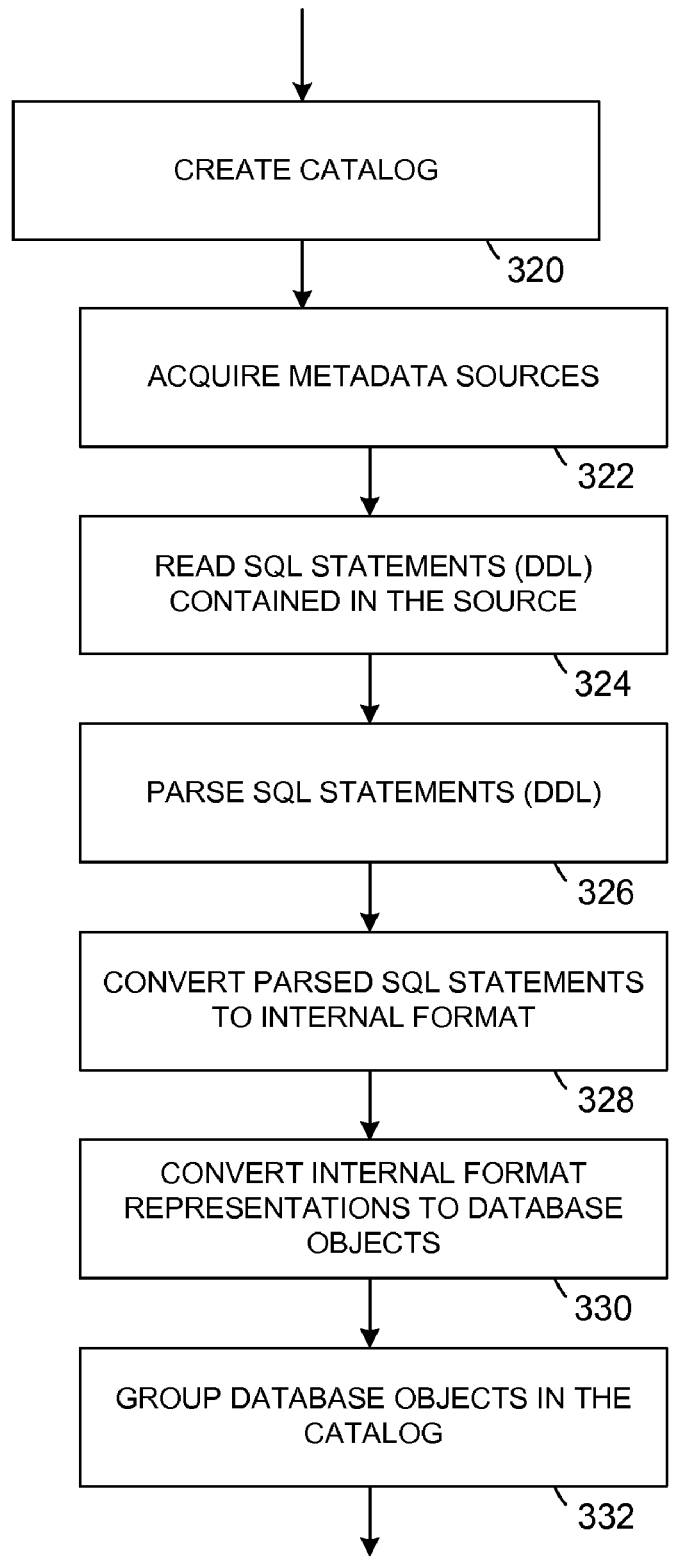

Referring to FIG. 3C, a flow chart shows an embodiment of a computer-executed method for creating 320 the catalog. The catalog can be created 320 by acquiring 322 metadata sources that define a workload data schema, reading 324 structured query language (SQL) statements contained in the metadata sources, and parsing 326 the SQL statements. The parsed SQL statements are converted 328 to internal format representations, and these representations are transformed 330 to database objects. The database objects can be grouped 332 in the catalog.

Examples of metadata sources that can be acquired 322 include user-provided plain text files containing CREATE statements that define tables for a workload, user-provided extensible markup language (XML) files containing CREATE statements embedded in XML tags, system-loaded metadata exported to an XML file with embedded SQL statements from a data definition language (DDL) model, and the like.

In an example embodiment, the internal representation can be transformed 330 to database objects comprising columns, tables, views, and schemas.

Figure 3D:
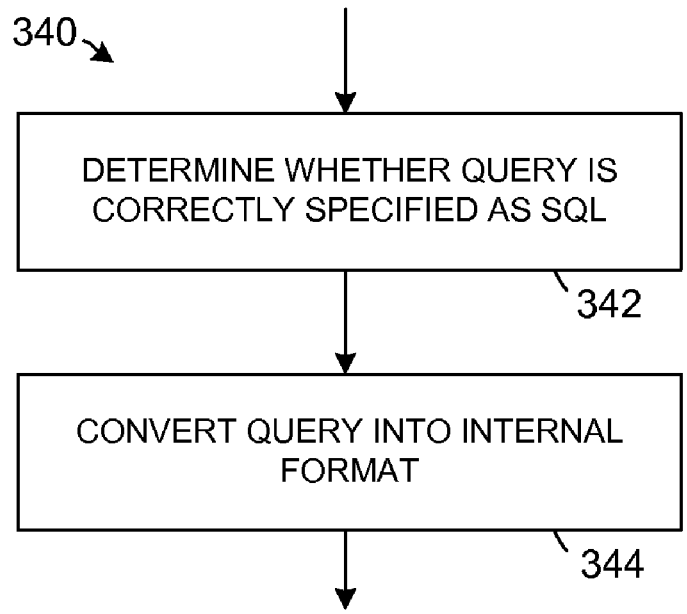

FIG. 3D illustrates an embodiment of a method for parsing 340 statements, for example by determining 342 whether a statement is correctly specified according to a structured query language (SQL) grammar; and converting 344 the statement into an internal format.

Figure 3E:
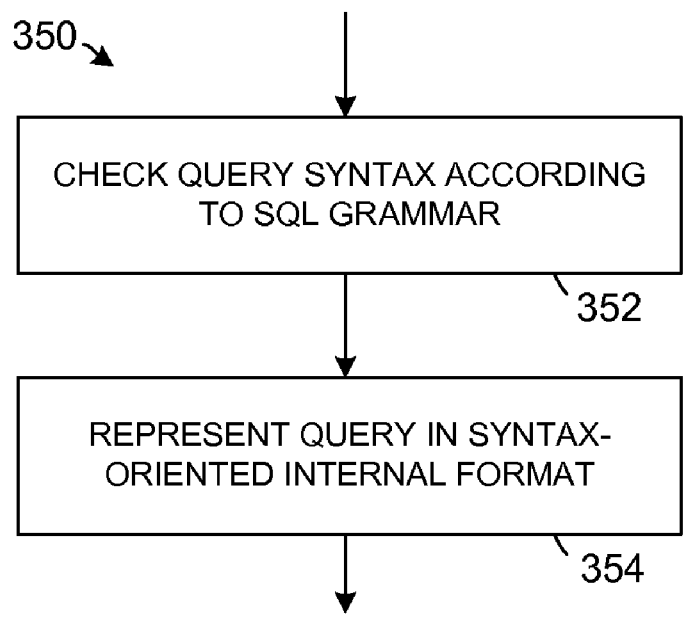

FIG. 3E is a flow chart that illustrates another aspect or embodiment of a method for parsing 350 statements comprising checking 352 syntax of a statement according to a structured query language (SQL) grammar and representing 354 the statement in a syntax-oriented internal format.

The parsing method 350 can further comprise expressing a SQL statement in abstractions. This abstraction mechanism is the basis for the internal format representation. Abstractions can include column references, structured query language (SQL) statements, expressions, table references, Boolean expressions, predicates, and the like.

Figure 3F:
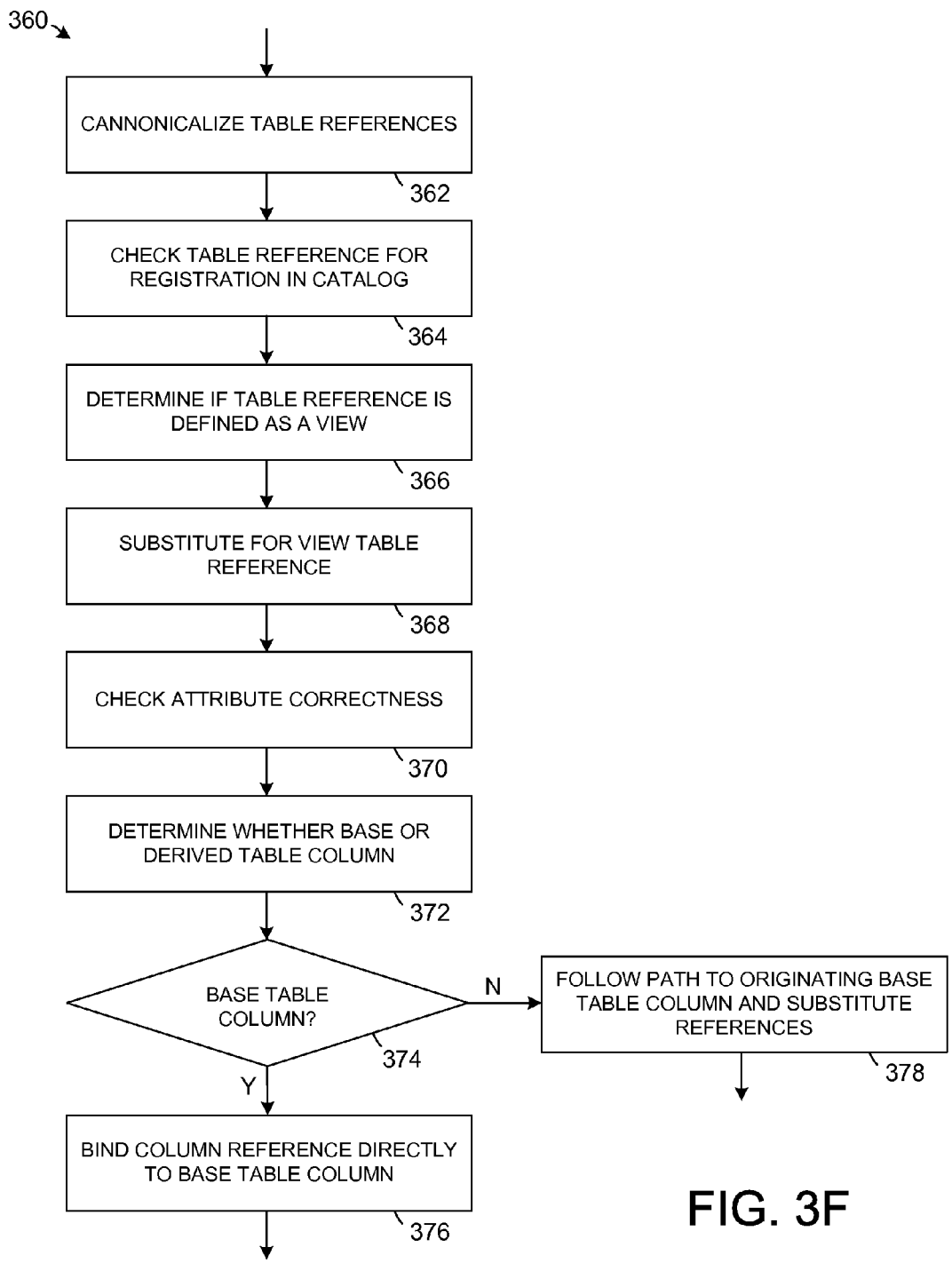

Referring to FIG. 3F, a flow chart depicts an embodiment of a technique for binding 360 table and column references. An illustrative binding 360 method comprises cannonicalizing 362 table references into a catalog.schema.tablename format, checking 364 the table reference for registration in the catalog, and determining 366 whether the table reference is defined as a view. The table reference can be substituted 368 for a table reference defined as a view by using a corresponding select statement. Attribute references can be checked 370 for correctness by using the catalog based on information about the table. The method 360 can further comprise determining 372 whether column references point to a base table column or a derived table column, and binding 376 the column reference directly to the base table column if the column reference points to the base table column 374. A path of the derived tables column is followed 378 to a base table where the column reference originates and substituting all column references contained in predicates if the column reference points to the derived table column.

Figure 3G:
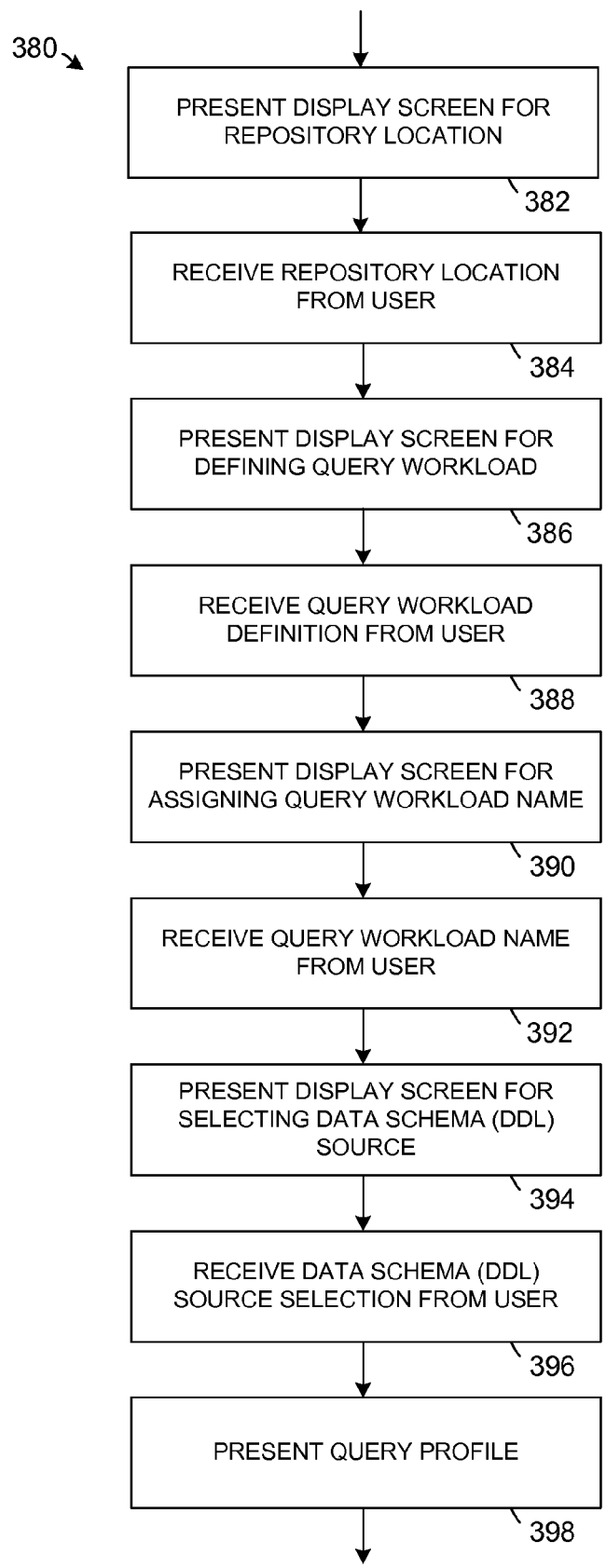

Referring to FIG. 3G, the profiling method can further include handling of graphical user interface interactions with a user. In an illustrative technique for operating 380 a graphical user interface, repository location can be set by presenting 382 a display screen for setting location of the repository, and receiving 384 a repository location specification from a user. A query workload is defined by presenting 386 a display screen for defining a query workload and receiving 388 a query workload definition from the user. A query workload name can be set by presenting 390 a display screen for assigning a name to the query workload and receiving 392 a query workload name from the user. A data schema source can be set by presenting 394 a display screen for selecting a data schema source and receiving 396 a data schema source selection from the user. A display screen of a query profile is presented 398 which includes a workload-wide view of a query set based on profiling database queries in the workload.

In an example application, a database can be designed based on the profiling of database queries.

Figure 4:
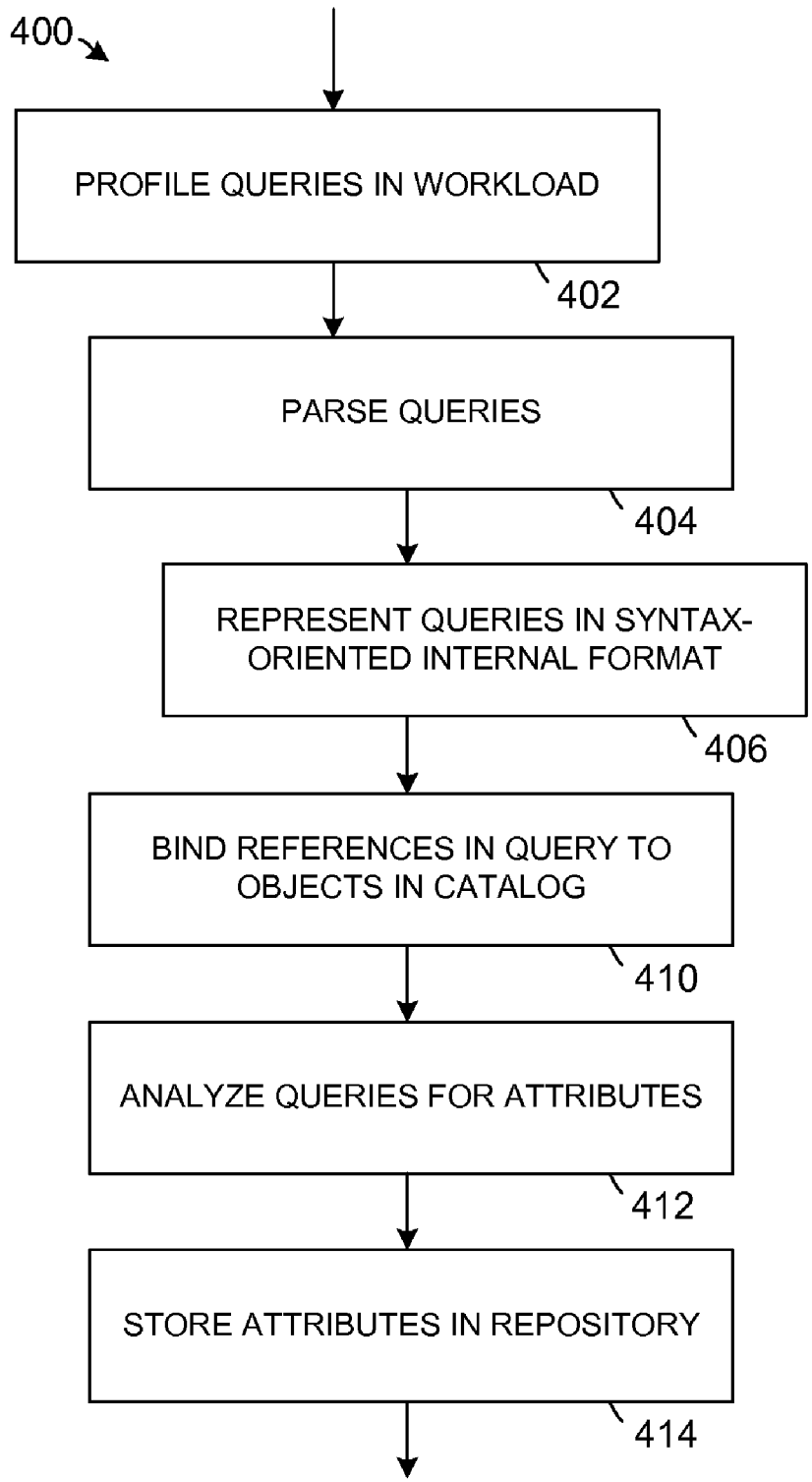
FIG. 4 a flow chart shows another embodiment of a controller-executed method for operating a query profiler system.

Referring to FIG. 4, a flow chart shows another embodiment of a controller-executed method 400 for operating a database system. The method 400 comprises profiling 402 database queries in a workload. Database query profiling 402 can be performed by parsing 404 statements against metadata extracted from a data definition language (DDL) model in a catalog of database objects. Parsing 404 of the queries can comprise checking 406 syntax of a statement according to a structured query language (SQL) grammar, and representing the statement in a syntax-oriented internal format. The method for database query profiling 402 can further comprise binding 410 references in a query to objects contained in the catalog, and analyzing 412 the queries for relevant attributes. The attributes can be stored 414 in a repository.

Figure 5:
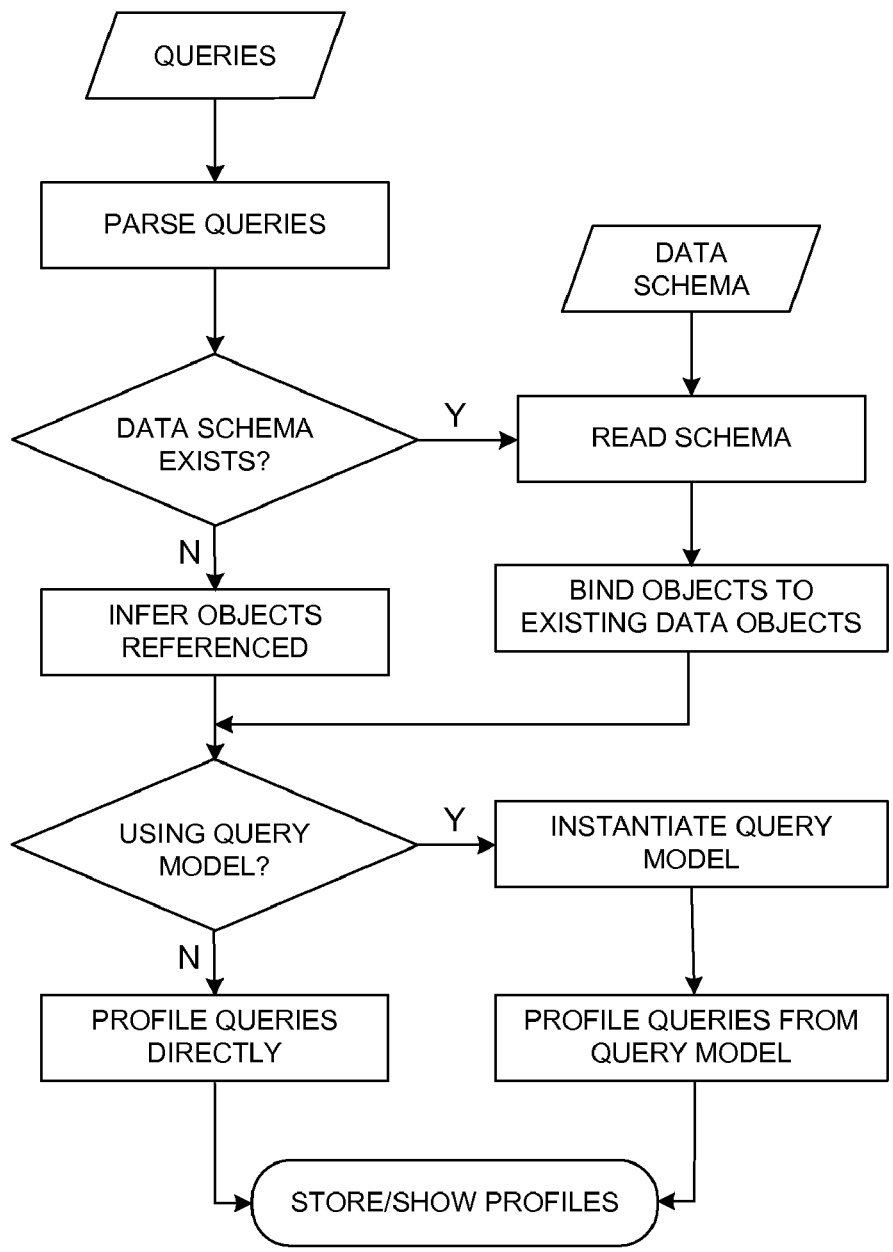
FIG. 5 is a schematic flow chart representing a generalization of a technique for automated query profiling.

Referring to FIG. 5, a schematic flow chart represents a generalization of a technique for automated query profiling. In the illustrative example, the process does not depend on the data definition language (DDL) used to specify the optional data schema nor the data manipulation language (DML) used to express the queries. For example, the query set profiled can be written using XQuery with an optional schema specified by an XSD instance.

Referring again to FIG. 1, given a query set and corresponding DDL, the query profiling process starts with extraction of the metadata from the DDL via operation of the catalog manager 116 which extracts and converts all the data definition elements into a set of database objects. The SQL parser 118 processes all queries corresponding to a given workload. The result of the parsing phase is a set of instances of query representations based on the internal format model 102. The binder 104 is in charge of hooking up each table or column reference in each query to a real table, view or column object contained in the catalog. The query analyzer 106 acquires and scans each of the query representations to attain all relevant attributes and store the attributes in the repository 112.

Figure 6:
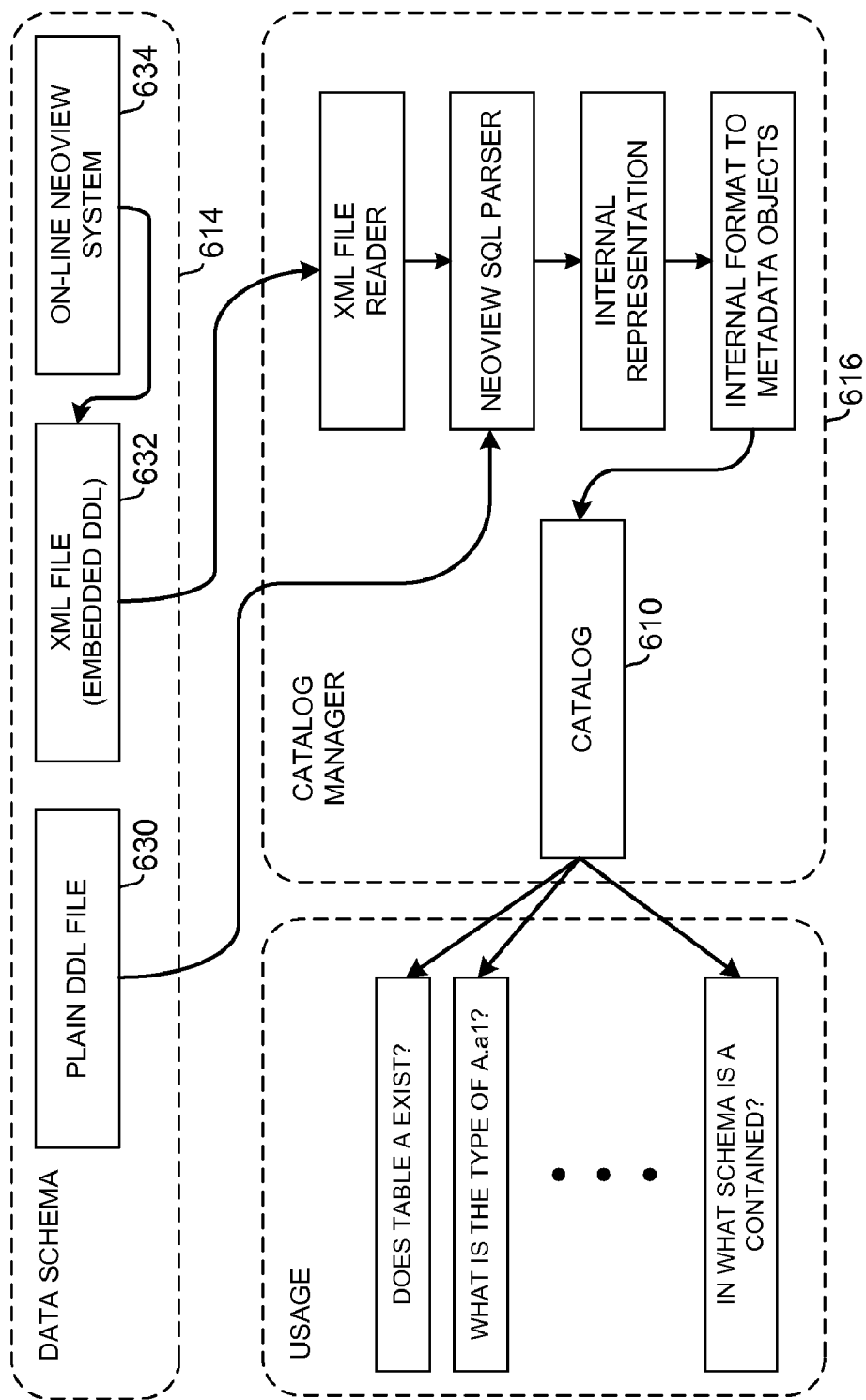
FIG. 6, a schematic block diagram illustrates functional aspects of a catalog manager 616 in additional detail.

Referring to FIG. 6, a schematic block diagram illustrates functional aspects of a catalog manager 616 in additional detail. The profiling process starts with creation of the catalog 610, which is used in all subsequent profiling steps. FIG. 6 shows the internal structure of the catalog manager 616, as well as the process of reading the metadata information for a given workload.

Catalog extraction begins with acquisition of the sources that define the workload's data schema 614. Three different kinds of metadata sources exist including a plain text file 630, an XML file 632, and an on-line Neoview system 634. The plain text file 630 is supplied by a user and contains CREATE statements that define all the tables for a given workload. The XML file 632 is also supplied by the user and contains CREATE statements embedded in XML tags. When data is already loaded in a Neoview system 634, an export utility can be used to dump the metadata to an XML file which is similar to the XML file 632 and has the same embedded SQL statements.

Once a metadata source is acquired, the catalog manager 616 reads the SQL statements contained in the source. The SQL statements are parsed and converted to a internal representation. The catalog manager 616 transforms the representations to database objects and groups the database objects in the catalog 610. The database objects contained in the catalog 610 are Column, Table, View, or Schema objects.

After the catalog 610 is created the user can query the catalog manager 616 with questions regarding the existence of metadata objects, functionality enabled by the binder and the query analyzer or profiler.

Figure 7A:
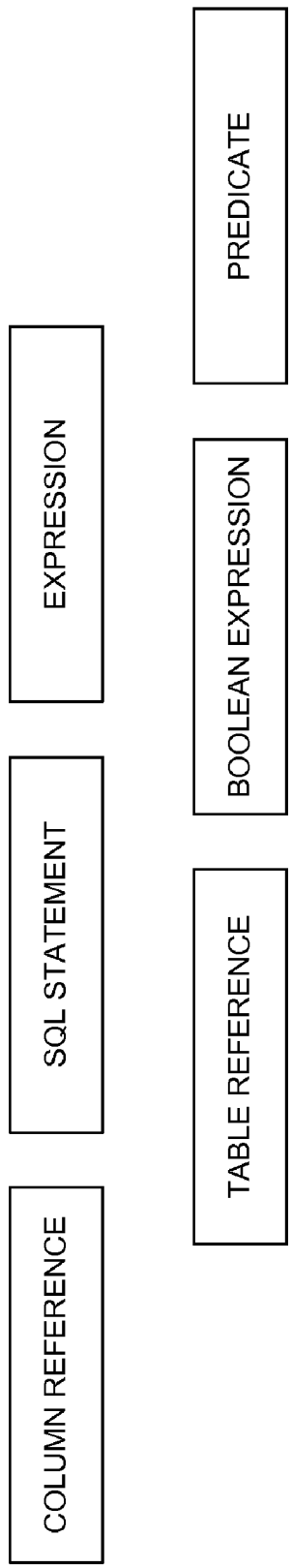
FIGS. 7A, 7B, and 7C depict a class diagram and schematic block diagrams showing functional aspects of query parsing and a query model.
Figure 7B:
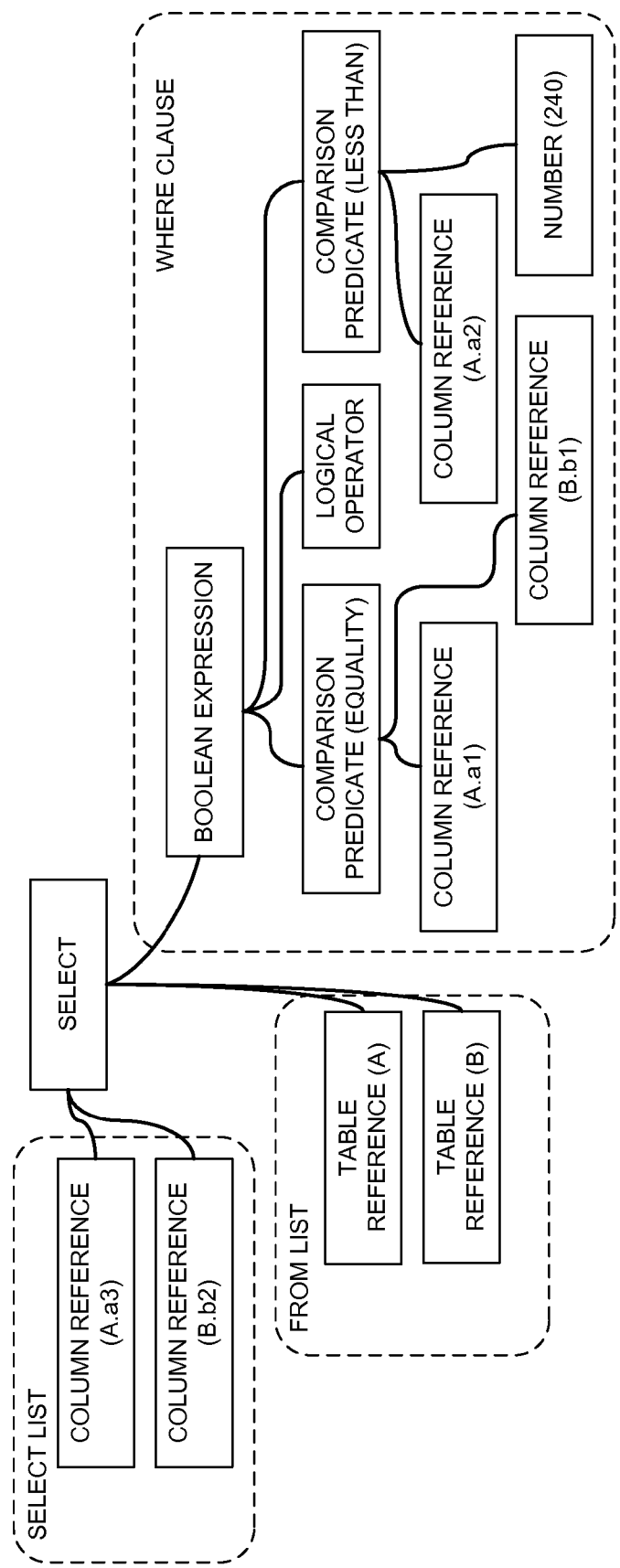
Figure 7C:
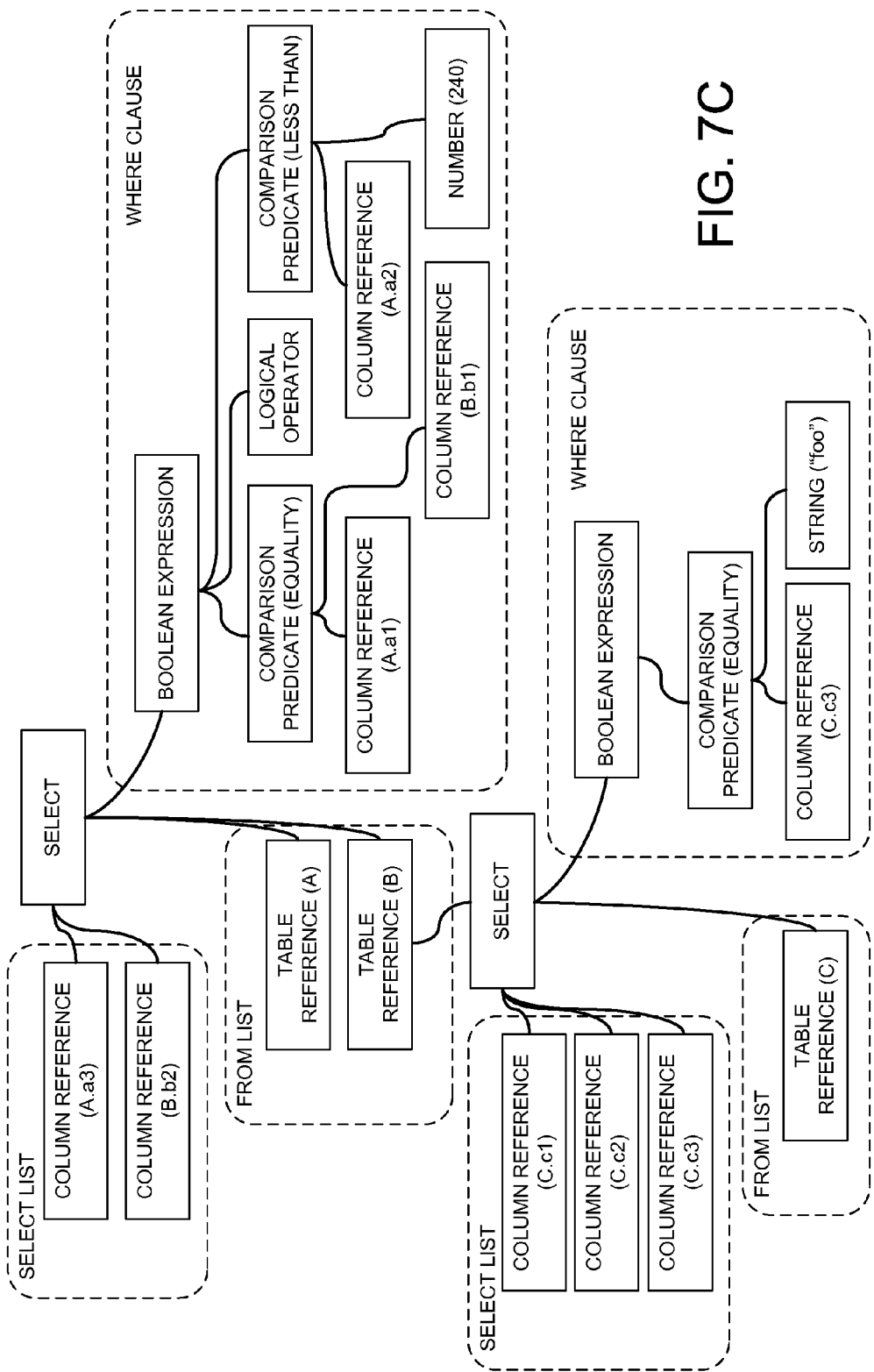

Referring to FIGS. 7A, 7B, and 7C, a class diagram and schematic block diagrams show functional aspects of statement parsing and an internal format model. Given a SQL statement, the main task for a parser is to check that the query is correctly specified, for example based on Neoview's SQL grammar, and to convert the statement into a suitable internal format. Syntax checking is done naturally as part of the parsing process, during which time the parser generates the internal representation.

Traditional Data Base Management Systems (DBMSs) use an internal representation or format that can be logically viewed as an operator tree, where each of the relational operations implied by the statement, such as joins and projections, are mapped to a node. Each operation is applied to base tables or intermediate results of a given query, starting from the bottom (base tables) and finishing with the resulting relation presented to the user.

In the case of query profiling, the physical execution of a query is not of interest, but rather the "static" view (or shape) of a query is pertinent. Thus, only the SQL elements contained in a given query as well as the database objects of reference are analyzed. Therefore, a representation that is more syntax-oriented than operator-oriented is sufficient. Thus the pertinent query model resembles a syntax tree, not an operator tree. The main abstractions of our query model are expressed in the class diagram depicted in FIG. 7A.

Each of these classes has descendants that are used to represent a particular query. For example, given a query:

```
SELECT   A.a3, B.b2
  FROM   A, B
  WHERE A.a1 = B.b1 AND
        A.a2 < 240
``` the representation obtained is shown in FIG. 7B.

As shown, select is a type of SQLStatement and ComparisonPredicate is a type of Predicate. If the query is slightly changed and table reference B is substituted the FROM list by a subquery, the result becomes:

```
SELECT   A.a3, B.b2
  FROM   A JOIN (
         SELECT   C.c1, C.c2, C.c3
           FROM C
           WHERE C.c1 = 'foo'
         ) as B (b1, b2, b3)
  WHERE  A.a1 = B.b1 AND
         A.a2 < 240
``` and the representation obtained is shown in FIG. 7C.

Many types of objects can be used to represent a query according to a suitable class diagram.

Figures 8A, 8B:
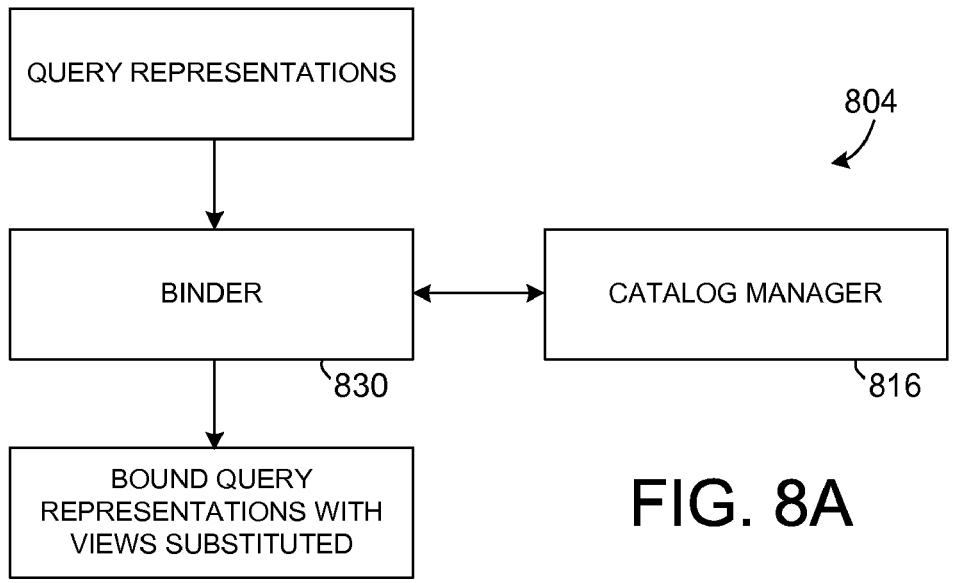
FIGS. 8A and 8B are a block diagram and functional diagram illustrating operation of an example implementation of a binder and view rewriter.

Referring to FIGS. 8A and 8B, a block diagram and functional diagram illustrate operation of an example implementation of a binder and view rewriter 804. As shown in FIG. 8A, binder 830 considers each of the table references in the FROM clause cannonicalized into a catalog.schema.tablename format. Usually, a user omits the catalog.schema part when writing the query. The binder 830 invokes the catalog manager 816 to determine whether the table is registered in the catalog, also checking for whether the table is defined as a view. If so, the table is substituted by the corresponding Select statement.

Based on information about the table, the binder 830 then uses the catalog to check that attribute references are correct, also simultaneously determining whether the column reference is either pointing to a base table's column or to a derived table column. In the former case the column reference is bound directly to the base table's column. In the latter case, the binder 830 follows the path of the derived table's column until reaching the base table where that column reference originates. Then, the binder 830 substitutes all column references contained in predicates by the new column reference, as shown in FIG. 8B.

In the Illustrative example, the binder 830 follows the path of SUB1.c3 until finding the path arises from base table E. The binder 830 then substitutes all SUB.c3 references by E.c3 contained elsewhere in that query nesting level.

The illustrative technique for treating column references is significantly different from the operation of traditional DBMSs. Since the query representation in a regular DBMS is operator-oriented, a column reference from a derived table is treated not as coming directly from the base table but as being "filtered" in inner subqueries by the evaluation of joining and restriction predicates. In the illustrative example, an implication is that SUB.c3 is E.c3 but only for tuples that comply with the joining predicates D.c1=E.c3 and C.c2=B.c3.

Figure 9:
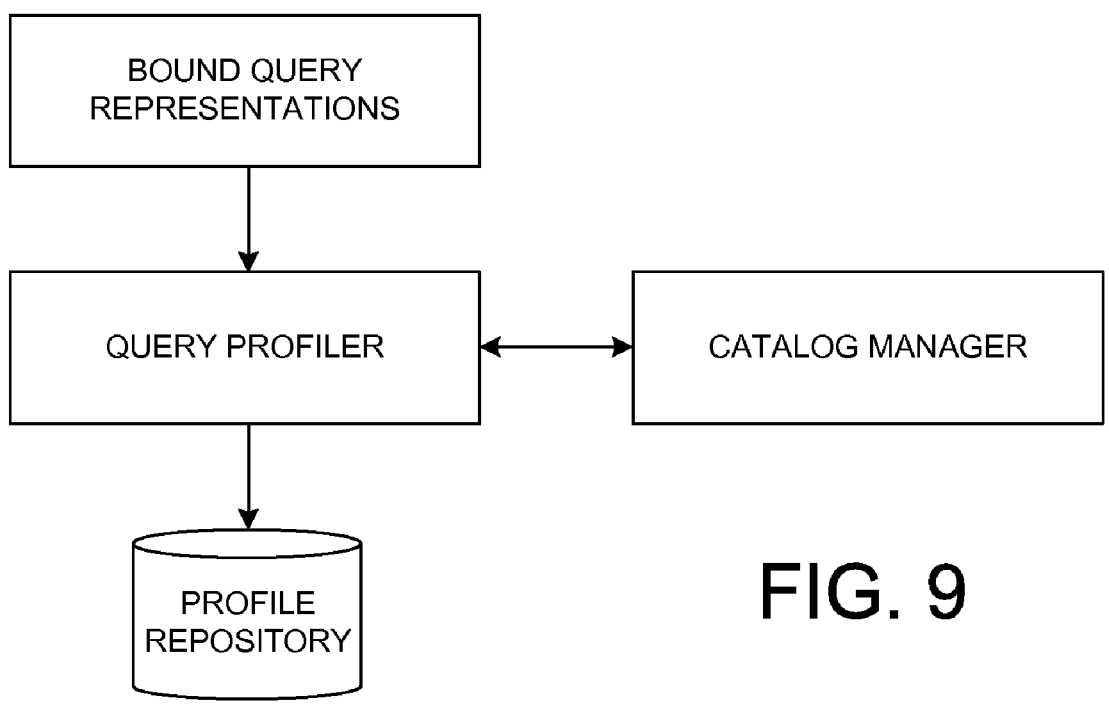
FIG. 9 is a schematic block diagram showing functional aspects of an embodiment of a query analyzer or profiler.

Referring to FIG. 9, a schematic block diagram shows functional aspects of an embodiment of a query analyzer or profiler, a module for performing profiling of queries. Individual query representations are scanned and, depending on the type of data manipulation language (DML) statement, the query analyzer 906 extracts distinct attributes. For SELECT statements the query analyzer 906 extracts columns contained in the list of columns in the select list, tables contained in the FROM list, restriction predicates, join predicates, group by columns, order by columns, subqueries, and the like.

For DELETE, INSERT and UPDATE statements, the query analyzer 906 extracts the restriction predicates and subqueries contained within the statement. For subqueries, the same elements extracted for SELECT statements are obtained.

Figure 10A:
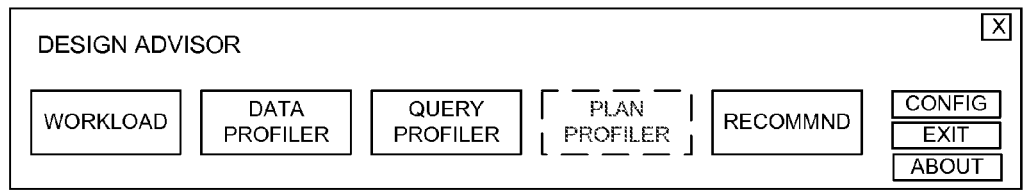

Referring to FIGS. 10A through 10L, several schematic display screens depict aspects of a graphical user interface (GUI) for operating the query profiler. The query profiler includes a GUI that assists the user to supply input sources for query and data schema, and to visualize the output of the profiling process. Referring to FIG. 10A, the GUI displays a main menu when a user activates an application program then incorporates the query profiler.

Figure 10B:
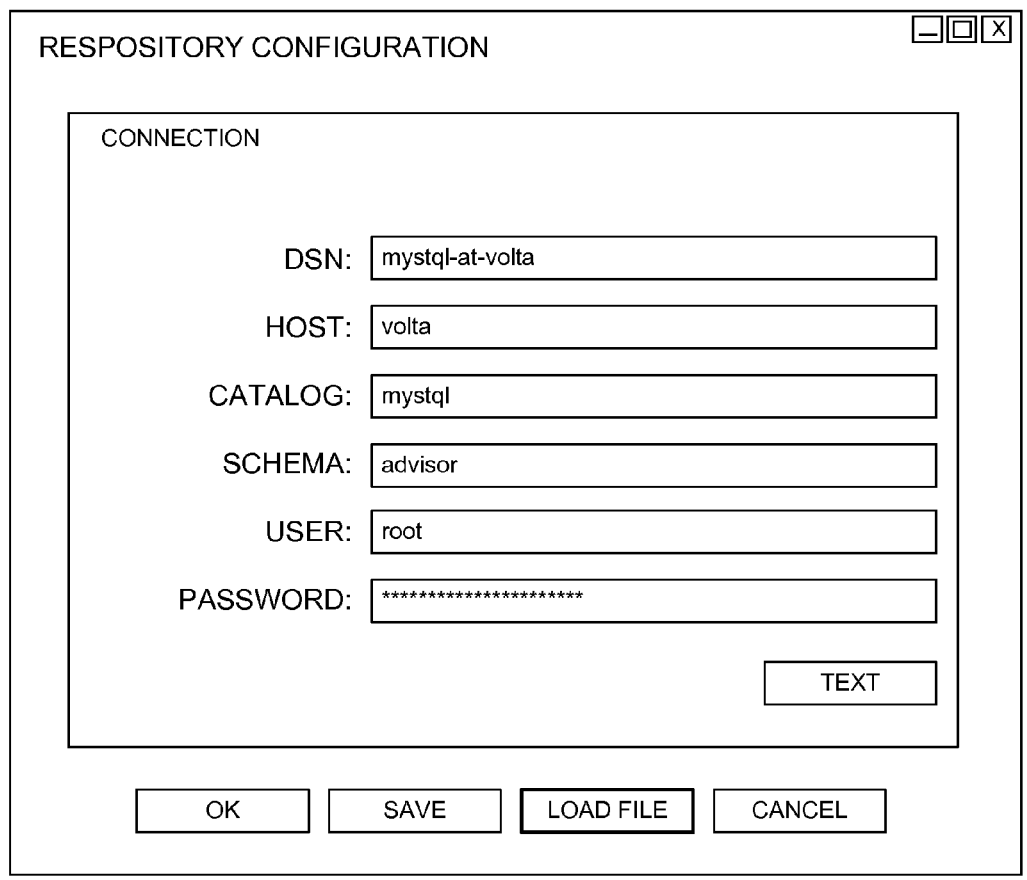

Referring to FIG. 10B, the user configures the location of the repository. To begin usage of the query profiler, a user configures the database connection to the repository. The repository is a database where for storing the data profile and query profile. The user can click on a Configure button to open the configuration window shown in FIG. 10B. In a particular implementation, all fields can be defined as mandatory, except in a condition that the password is an empty string. A DSN field contains a list showing all Data Source Names (DSN) defined system-wide and for the current user. The example application can support DSNs for MySQL, Neoview, and other DBMSs in.

Figure 10C:
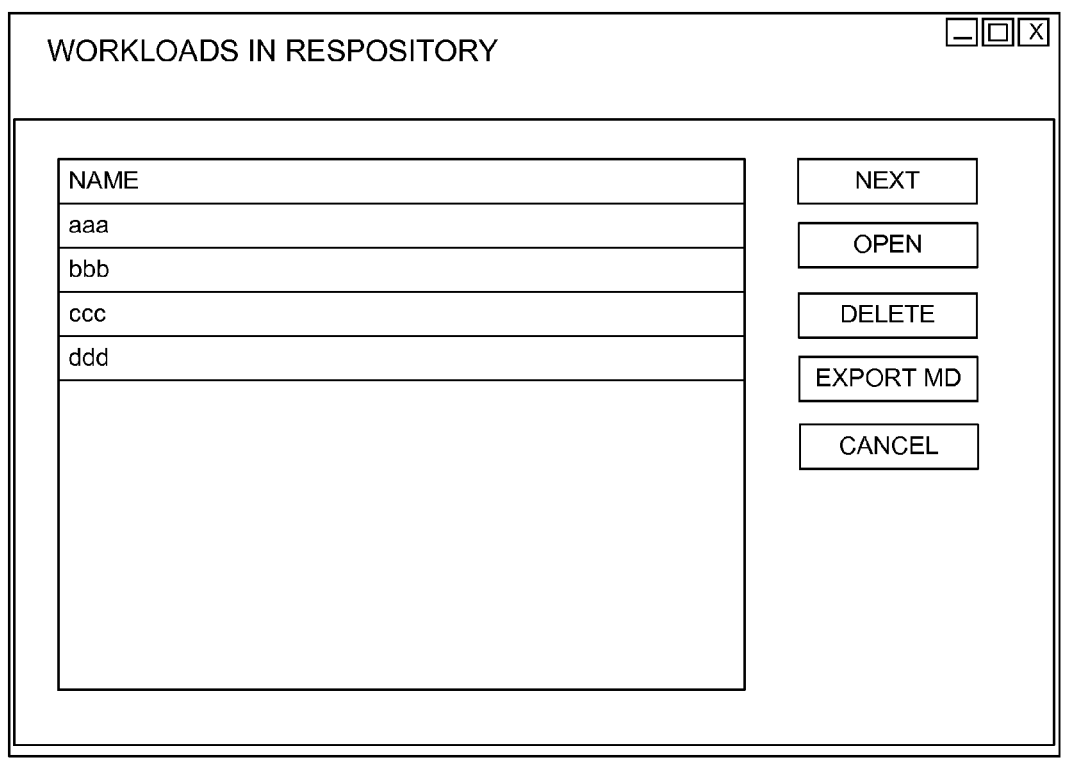

Once the repository's connection is properly configured, a workload creation screen is shown in FIG. 10C that is used to create a new workload in the repository. The user clicks a Workloads button of the main menu to cause display of the workload creation screen which includes a list of existing workloads in repository. A New button opens an Open File dialog. A file containing the queries is to be supplied along with DDL which is accessed according to a subsequent display screen. More than one file can be specified by holding the ctrl key during selection.

Figure 10D:
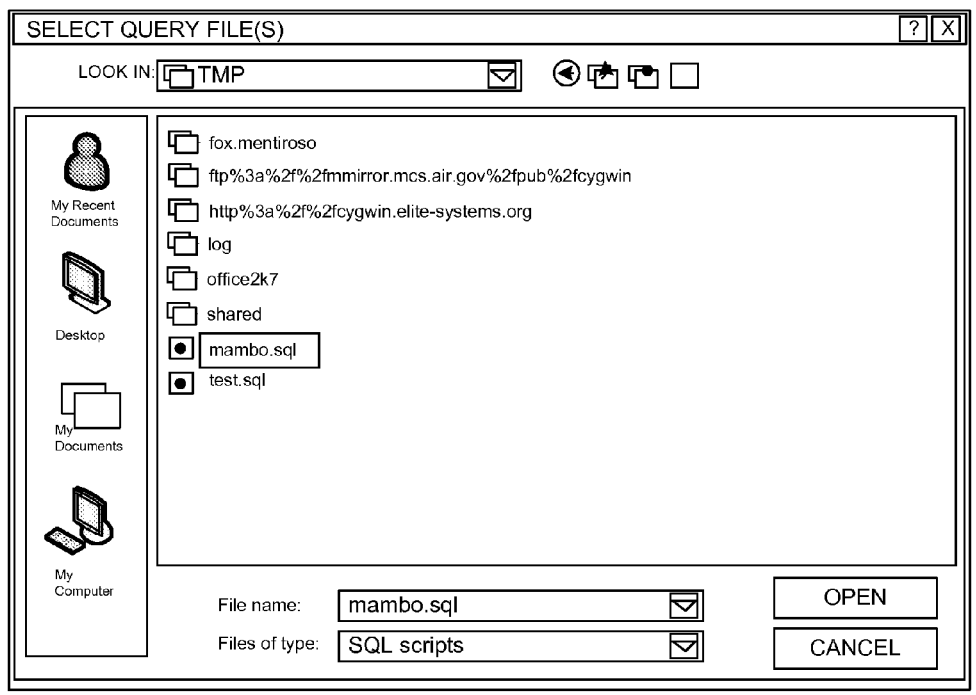
Figure 10E:
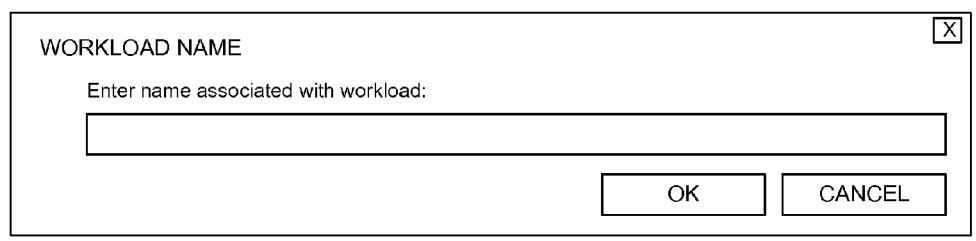

Using a screen shown in FIG. 10D, the user can define the query workload from existing files.

After the query set is supplied, the GUI requests a name for association with the workload. The name has to be unique with respect to other workloads already in the repository. Using a screen such as in FIG. 10E, the GUI enables the user to assign a name to the query workload. After assignment of the name, the Workloads in Repository window is disposed and the GUI progresses to configuration of the data profiling and query profiling phase.

Referring to FIG. 10F, the data profiling phase can be configured using a configuration display screen to profile the data referenced by the workload. The Data Profiler Configuration window can be accessed by clicking the Data Profiler button of the main menu. Data can be accessed from different sources, for example a system, plain files, or from a previously profiled workload. Configuration depends on the particular source.

Figure 10G:
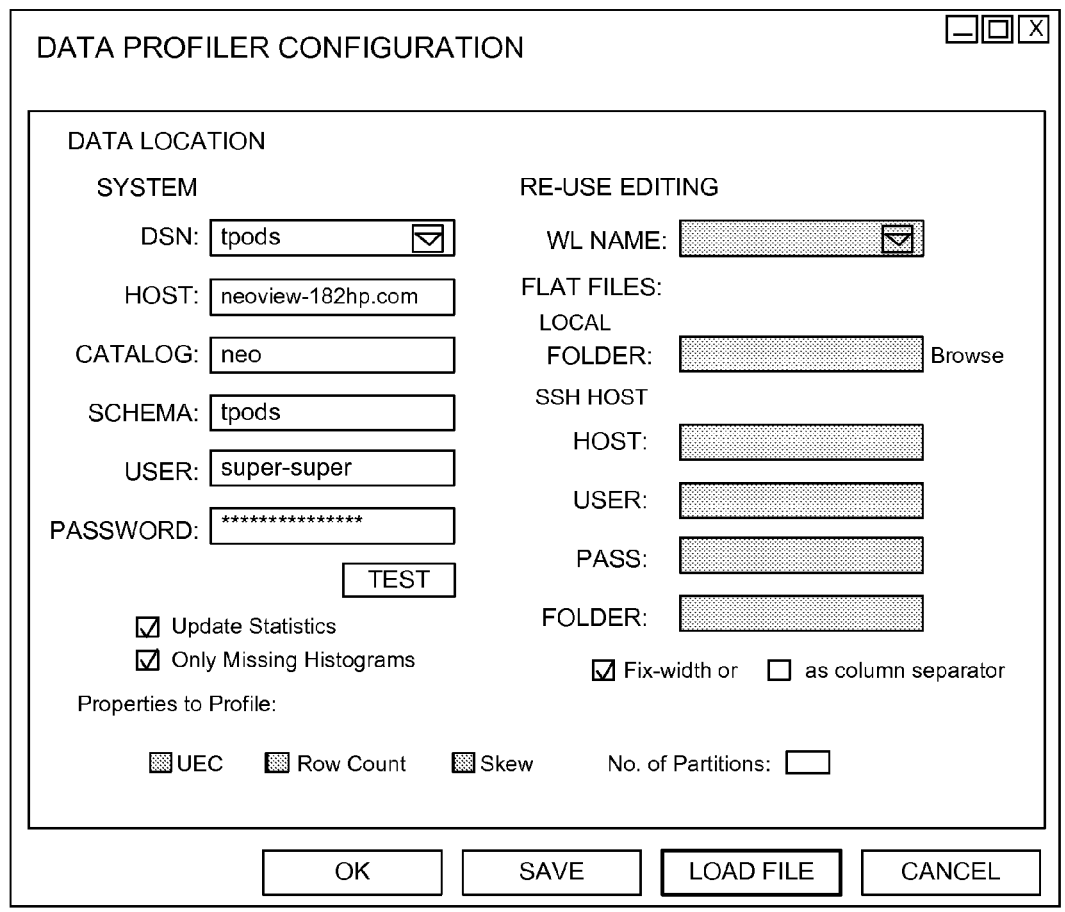

FIG. 10G shows a Data Profiler Configuration window for a system source, for example a Neoview system source. When the data is already loaded in a system such as the Neoview system, data profiler functionality depends on the configuration for connection to the database. For example, access to system metadata can be limited to super.super or super.services users. In addition to database connection parameters, the user specifies whether histograms for the existing data have to be calculated, for example using an Update Statistics checkbox. The user specifies whether the histograms are to be created for the first time or recalculated. For recalculation, the user can specify calculation only of histograms that were not previously created, for example by also checking the Only Missing Histograms box.

Figure 10H:
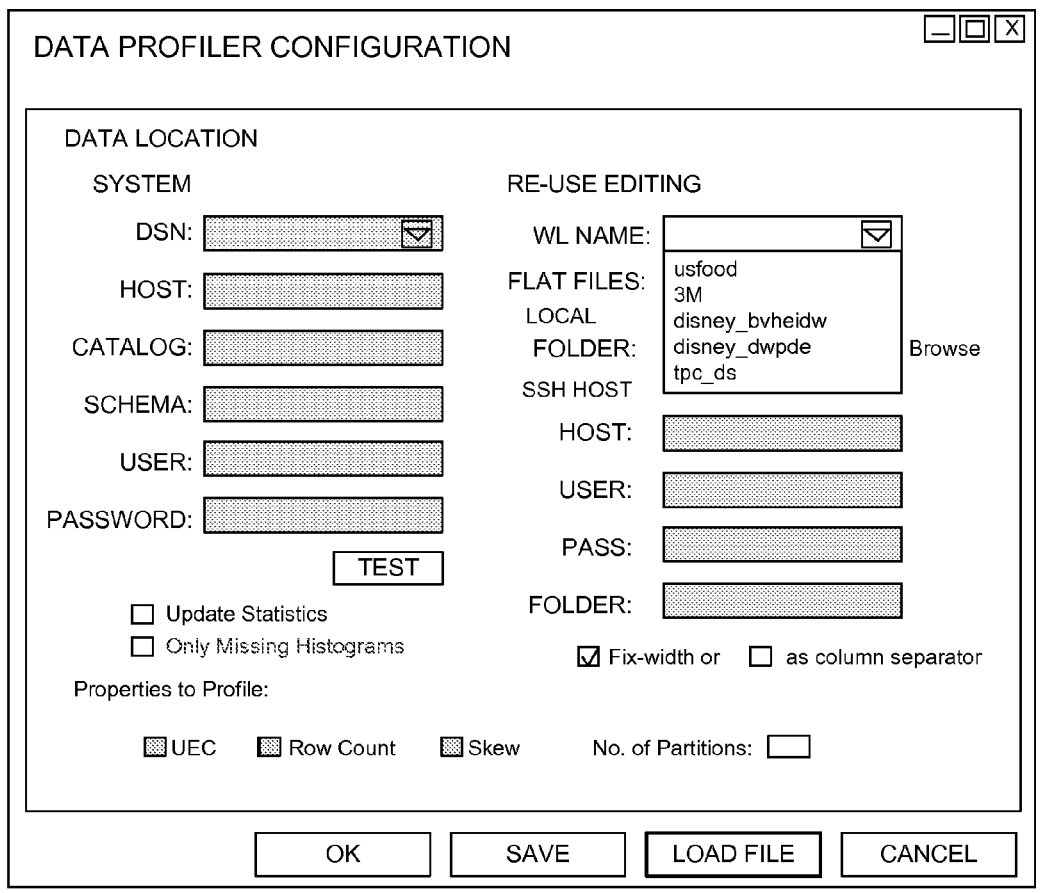

FIG. 10H shows a Data Profiler Configuration window for re-use of a data profiling from a previously profiled workload. In the case of a new workload, the data may be the same as for a previous profile but the query set may be different. The data can be re-used by specifying the existent profile name in the corresponding field using the screen of FIG. 10H.

FIG. 10I shows a Data Profiler Configuration window for a plain file source. Plain data files can have one of two formats: fixed-column-width or delimited (commonly known as CSV) format. The user specifies fixed-column-width by checking the Fix-width box. The user indicates that the format of the files is CSV by un-checking the Fix-width checkbox, thereby enabling the adjacent textbox where user-typed string is used as delimiter. Plain data files can be located in the local machine where the query profiler is running or in a remote host. For the remote host connection, the GUI SSH, thus a valid username and password are to be supplied, as well as the host name and the remote folder path to the data. When a file corresponding to a table does not exist, the GUI continues to read process the following table. For example, for a local folder C:\tmp\data\ containing the contents of the database referenced by the query set in fixed-width format, the example configuration is shown in FIG. 10I. The folder should contain a folder named config containing one XML configuration file per table.

Regardless of the data source type, the data profiling phase is bundled with the query profiling phase, thus the data profiling does not start immediately after the configuration is completed, but is performed along with the query profiling phase.

Figure 10J:
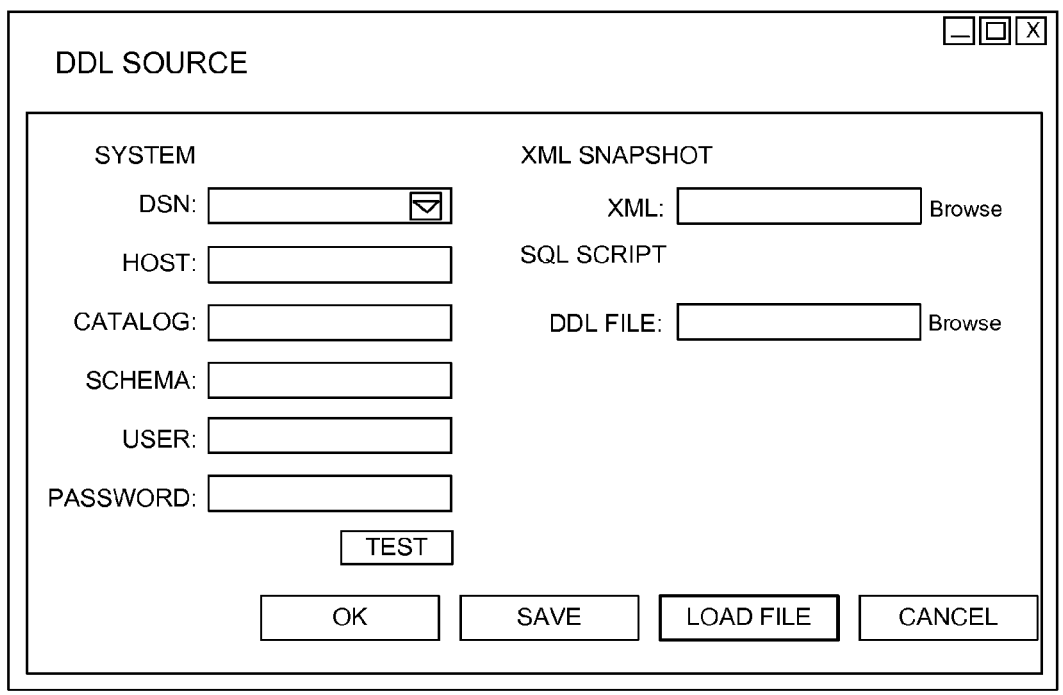

After data profiling is configured, the user starts query profiling. Before query profiling begins, the data schema or DDL for the data that the query set references is enabled for access by clicking in the Query Profiler button of main window. The three types of DDL sources are a system (for example, Neoview system), an XML snapshot, or a DDL plain file. When the source is a DDL file, more than one file can be specified by holding the ctrl key during selection. As shown in FIG. 10J, a screen enables the user to finish with input data by selecting a DDL schema source.

After the DDL source is configured, a window can appear (not shown) depicting progress of the query and data profiling tasks. And after the window disappears, the job has finished.

Figure 10K:
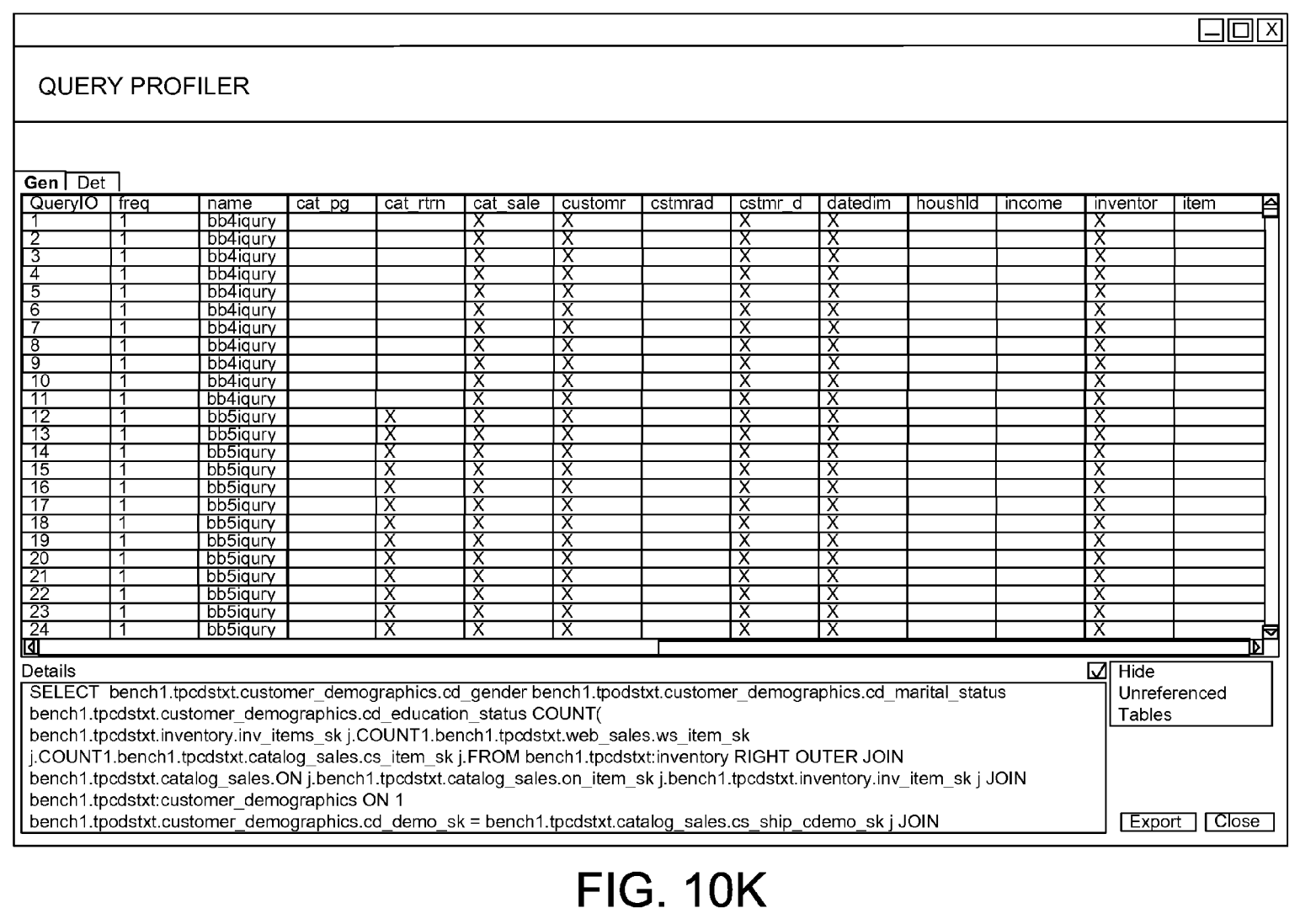
Figure 10L:
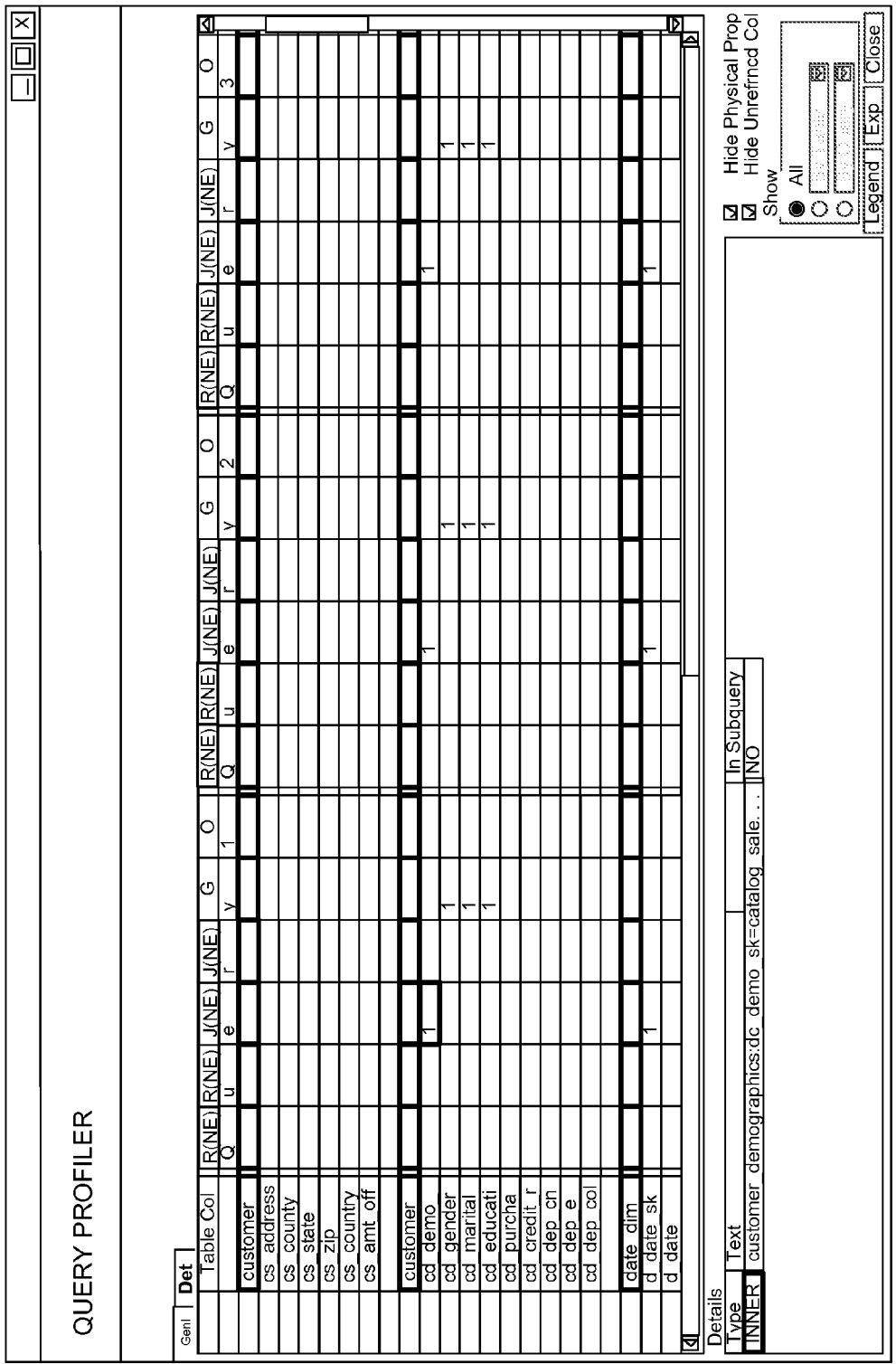

After the user configures the input data, query profiler applies the profiling process and, upon completion, the GUI displays a spreadsheet-type display interface as shown in FIGS. 10K and 10L, typically in multiple parts. The spreadsheet-like interface can be composed of two tabs, general and detailed. The general tab in FIG. 10K shows a quick workload-wide view of the query set. For each query, the GUI shows frequency, name and identifier (ID). Columns in the spreadsheet represent each of the tables contained in the DDL. Each row (or query) contains an 'X' mark to denote that the corresponding table appears within. Clicking on a cell loads the text of the corresponding query in the text box below the spreadsheet. If the selected cell is marked with an X, the name of the corresponding table is highlighted in the text with blue. To obtain a more compacted view a Hide Unreferenced Tables checkbox can be clicked, causing removal of all tables that are not referenced by the query set.

A next tab is shown in FIG. 10L with a more detailed view of the profile. The Detailed Tab presents information across the workload or every column, query and SQL clause. The number on each cell represents the number of SQL elements of a given type that appears in the column corresponding to the cell. By clicking in each of the cells that have a number within detailed information is displayed in the Details text box.

Six SQL element types correspond to the six columns for each query and include R(E), R(NE), J(E), J(NE), G, and O. The R(E) type designates restriction predicates of equality. Specifically including query text for the predicate, whether or not inside a subquery. The R(NE) type specifies restriction predicates that involve non-equality predicates such as < >, <, >, between, in, and the like. Query text identifies where the predicate appears, whether or not inside a subquery. The J(E) type is similar to the R(E) type but applies to join predicates. Thus, the J(E) appears the same as R(E) but with the join type in the first column. The J(NE) type is similar to the R(NE) type but applies to join predicates. Thus, J(NE) is the same as R(NE) but with the join type in the first column. The G type specifies whether or not a group is indicated by column and shows the position of the column in the group clause as well as the information of where the group appears. The O type specifies whether a group is indicated by column. The position of the column in the group clause is shown as well as the information of where group appears.

In the image depicted in FIG. 10L, for query 1 and table customer_demographics, one column (cd_demo_sk) is used as a join predicate. The detail shows an INNER join that it is not contained in a subquery. For the same table, three columns are used to group the resulting table.

Figure 11:
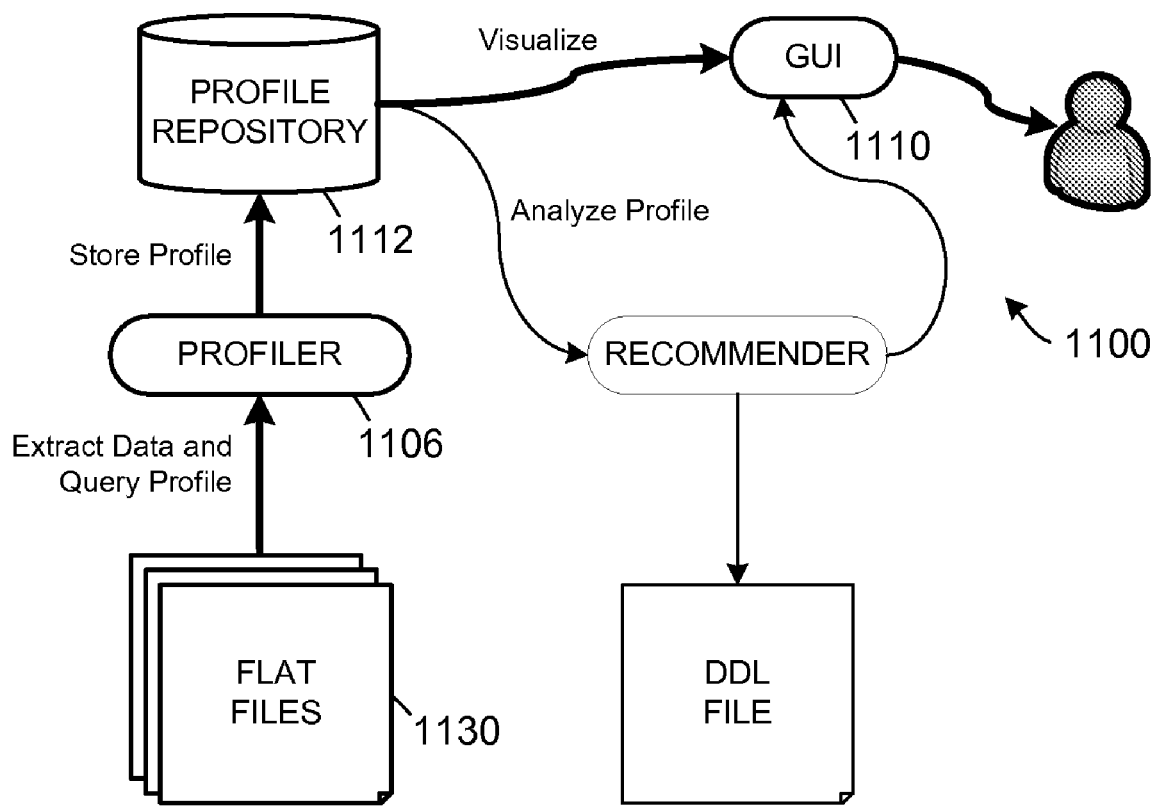
FIG. 11 is a schematic block diagram illustrating usage of a design profiler in an example physical design application.

Referring to FIG. 11, a schematic block diagram illustrates usage of a design profiler in an example physical design application. A physical design advisor 1100 is an application that enables presentation of physical design recommendations for a database system. A physical design advisor's GUI 1110 aids a user to obtain a data and query profile of a given workload, depicted as flat files 1130, a profiler 1106, and a profile repository 1112. The profiles obtained by the physical design advisor 1100 can be used to generate a physical design recommendation.

The systems and methods described herein form a basis for a tool that fully automates profiling of queries. Automation makes the process much faster, for example from hours or days to minutes, and accurate. Profiles are not only captured into a document such as a spreadsheet, but are stored into a repository to be made available to other applications or available to the user through a query interface or a GUI. In addition, the GUI enables the user to interactively explore different characteristics of the profiles individually or aggregated as, for example, the number and type of predicates in a query, the tables that appear in most queries, the number of joins in which an attribute of a table appears, and the like. The GUI further enables the user to finely analyze details about the characteristics.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A controller-executed method for operating a query profiling system comprising:
   profiling database queries in a workload comprising:
      receiving a query set and a data definition language (DDL) model;
      extracting metadata of the DDL model;
      converting data definition elements of the metadata into a catalog of database objects;
      parsing queries corresponding to a workload to create a set of instances of query representations;
      binding table and column references in a query to a real table, view, or column object contained in the catalog;
      analyzing the queries for relevant attributes comprising complexity and number of predicates; and
      storing the attributes in a repository.

2. The method according to claim 1 further comprising:
   creating the catalog comprising:
      acquiring metadata sources that define a workload data schema, the metadata sources including at least one metadata source in a group consisting of user-provided plain text files containing CREATE statements that define tables for a workload, user-provided extensible markup language (XML) files containing CREATE statements embedded in XML tags, and system-loaded metadata exported to an XML file with embedded SQL statements from a data definition language (DDL) model;
      reading structured query language (SQL) statements contained in the metadata sources;
      parsing the SQL statements;
      converting the parsed SQL statements to internal representations;
      transforming the internal representations to database objects; and
      grouping the database objects in the catalog.

3. The method according to claim 1 further comprising:
   parsing queries comprising:
      determining whether a query is correctly specified according to a structured query language (SQL) grammar; and
      converting the query into an internal format.

4. The method according to claim 1 further comprising:
   parsing queries comprising:
      checking syntax of a query according to a structured query language (SQL) grammar;
      representing the query in a syntax-oriented internal format; and
      expressing an internal model in abstractions comprising column references, a structured query language (SQL) statements, expressions, table references, Boolean expressions, and predicates.

5. The method according to claim 1 further comprising:
   binding table and column references comprising:
      cannonicalizing table references into a catalog.schema.tablename format;
      checking a table reference for registration in the catalog;
      determining whether the table reference is defined as a view;
      substituting the table reference for a table reference defined as a view by using a corresponding select statement;
      checking that attribute references are correct using the catalog;
      determining whether column references point to a base table column or a derived table column;
      binding a column reference directly to the base table column if the column reference points to the base table column; and
      following a path of the derived table column to a base table where the column reference originates and substituting all column references contained in predicates if the column reference points to the derived table column.

6. The method according to claim 1 further comprising:
   analyzing the queries comprising:
      scanning statement representations; and
      extracting distinct attributes based on type of data manipulation language (DML).

7. The method according to claim 1 further comprising:
   extracting attributes for SELECT statements comprising columns contained in a list of columns contained in a select list, tables contained in a from list, restriction predicates, join predicates, group by columns, order by columns, and subqueries; and extracting attributes for DELETE, INSERT, and UPDATE statements comprising restriction predicates and subqueries.

8. The method according to claim 1 further comprising:
operating a graphical user interface comprising:
   presenting a display screen for setting location of the repository;
   receiving a repository location specification from a user;
   presenting a display screen for defining a query workload;
   receiving a query workload definition from the user;
   presenting a display screen for assigning a name to the query workload;
   receiving a query workload name from the user;
   presenting a display screen for selecting a schema source;
   receiving a schema source selection from the user; and
   presenting a display screen of a query profile comprising a workload-wide view of a query set based on profiling database queries in the workload.

9. A query profiling system comprising a controller programmed to implement:
   a parser that parses by checking syntax of queries according to a structured query language (SQL) grammar and representing the queries in a syntax-oriented internal format; then compares the queries against metadata extracted from a data definition language (DDL) model in a catalog of database objects;
   a binder and view rewriter that rewrites table references with their corresponding view definitions and binds references in a query to objects contained in the catalog;
   a query analyzer that analyzes the queries for relevant attributes and stores the attributes in a profile repository; and
   a catalog manager that creates the catalog by acquiring metadata sources that define a workload data schema, reading structured query language (SQL) statements contained in the metadata sources; and
   wherein said parser parses the SQL statements, converts the parsed SQL statements to query representations, and transforms the query representations to database objects, the catalog manager grouping the database objects in the catalog.

10. A query profiling system comprising a controller programmed to implement:
   a parser that parses by checking syntax of queries according to a structured query language (SQL) grammar and representing the queries in a syntax-oriented internal format; then compares the queries against metadata extracted from a data definition language (DDL) model in a catalog of database objects;
   a binder and view rewriter that rewrites table references with their corresponding view definitions and binds references in a query to objects contained in the catalog; and
   a query analyzer that analyzes the queries for relevant attributes and stores the attributes in a profile repository;
   the binder and view rewriter configured to bind table and column references by cannonicalizing table references into a catalog.schema.tablename format, checking a table reference for registration in the catalog, determining whether the table reference is defined as a view, substituting the table reference by a corresponding select statement for a table reference defined as a view, checking that attribute references are correct using the catalog, determining whether column references point to a base table column or a derived table column, binding a column reference directly to the base table column if the column reference points to the base table column, and following a path of the derived table column to a base table where the column reference originates and substituting all column references contained in predicates if the column reference points to the derived table column.

11. A query profiling system comprising a controller programmed to implement:
   a parser that parses by checking syntax of queries according to a structured query language (SQL) grammar and representing the queries in a syntax-oriented internal format; then compares the queries against metadata extracted from a data definition language (DDL) model in a catalog of database objects;
   a binder and view rewriter that rewrites table references with their corresponding view definitions and binds references in a query to objects contained in the catalog; and
   a query analyzer that analyzes the queries for relevant attributes and stores the attributes in a profile repository;
   the query analyzer configured to analyze the queries by scanning query representations, and extracting distinct attributes based on type of data manipulation language (DML) wherein the query analyzer extracts attributes for SELECT statements comprising columns contained in a list of columns contained in a select list, tables contained in a from list, restriction predicates, join predicates, group by columns, order by columns, and subqueries; and extracts attributes for DELETE, INSERT, and UPDATE statements comprising restriction predicates and subqueries.

12. A query profiling system comprising a controller programmed to implement:
   a parser that parses by checking syntax of queries according to a structured query language (SQL) grammar and representing the queries in a syntax-oriented internal format; then compares the queries against metadata extracted from a data definition language (DDL) model in a catalog of database objects;
   a binder and view rewriter that rewrites table references with their corresponding view definitions and binds references in a query to objects contained in the catalog;
   a query analyzer that analyzes the queries for relevant attributes and stores the attributes in a profile repository; and
   a graphical user interface presents a display screen for setting location of the profile repository, receives a repository location specification from a user, presents a display screen for defining a query workload, receives a query workload definition from the user, presents a display screen for assigning a name to the query workload, receives a query workload name from the user, presents a display screen for selecting a schema source, receives a schema source selection from the user, and presents a display screen of a query profile comprising a workload-wide view of a query set based on profiling of database queries in the workload.

13. A query profiling system comprising a controller programmed to implement:
   a parser that parses by checking syntax of queries according to a structured query language (SQL) grammar and representing the queries in a syntax-oriented internal format; then compares the queries against metadata extracted from a data definition language (DDL) model in a catalog of database objects;

a binder and view rewriter that rewrites table references with their corresponding view definitions and binds references in a query to objects contained in the catalog;

a query analyzer that analyzes the queries for relevant attributes and stores the attributes in a profile repository; and an article of manufacture comprising:

a controller-usable medium having a computer readable program code embodied in a controller for profiling database queries in a workload further comprising:

code causing the controller to receive a query set and a data definition language (DDL) model;

code causing the controller to extract metadata of the DDL model;

code causing the controller to convert data definition elements of the metadata into a catalog of database objects;

code causing the controller to parse queries corresponding to a workload to create a set of instances of query representations;

code causing the controller to bind table and column references in a query to a real table, view, or column object contained in the catalog;

code causing the controller to analyze the queries for relevant attributes; and code causing the controller to store the attributes in a repository.

\* \* \* \* \*

UNITED STATES PATENT AND TRADEMARK OFFICE
CERTIFICATE OF CORRECTION

| | | |
|---|---|---|
| PATENT NO. | : 8,122,066 B2 | |
| APPLICATION NO. | : 12/251320 | |
| DATED | : February 21, 2012 | |
| INVENTOR(S) | : Maria G. Castellanos et al. | |

It is certified that error appears in the above-identified patent and that said Letters Patent is hereby corrected as shown below:

In column 12, line 37, in Claim 5, delete "cannonicalizing" and insert -- canonicalizing --, therefor.

In column 13, line 59, in Claim 10, delete "cannonicalizing" and insert -- canonicalizing --, therefor.

Signed and Sealed this
Sixth Day of November, 2012

David J. Kappos
*Director of the United States Patent and Trademark Office*